United States Patent
Beers et al.

(10) Patent No.: US 10,342,293 B2
(45) Date of Patent: Jul. 9, 2019

(54) METHOD OF FORMING AN APERTURE IN A REEL MEMBER OF A TENSIONING SYSTEM FOR AN ARTICLE OF FOOTWEAR

(71) Applicant: NIKE, Inc., Beaverton, OR (US)

(72) Inventors: Tiffany A. Beers, Portland, OR (US); Andrew A. Owings, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 616 days.

(21) Appl. No.: 15/070,124

(22) Filed: Mar. 15, 2016

(65) Prior Publication Data

US 2017/0265572 A1    Sep. 21, 2017

(51) Int. Cl.
| | |
|---|---|
| *B21D 39/00* | (2006.01) |
| *A43C 11/16* | (2006.01) |
| *B23G 5/18* | (2006.01) |
| *A43C 11/00* | (2006.01) |
| *A43C 11/14* | (2006.01) |

(Continued)

(52) U.S. Cl.
CPC .......... *A43C 11/165* (2013.01); *A43B 3/0005* (2013.01); *A43C 11/008* (2013.01); *A43C 11/14* (2013.01); *B21D 39/00* (2013.01); *B23B 51/10* (2013.01); *B23B 51/102* (2013.01); *B23C 3/02* (2013.01); *B23C 3/12* (2013.01); *B23G 5/186* (2013.01); *B23C 2220/16* (2013.01); *B23C 2220/52* (2013.01)

(58) Field of Classification Search
CPC ... B23C 2220/52; B23G 5/186; A43C 11/165; B21D 39/00
See application file for complete search history.

(56) References Cited

U.S. PATENT DOCUMENTS

| | | |
|---|---|---|
| 1,909,277 A | 3/1931 | Jamar, Jr. |
| 3,430,303 A | 3/1969 | Donald et al. |

(Continued)

FOREIGN PATENT DOCUMENTS

| | | |
|---|---|---|
| CN | 109152452 A | 1/2019 |
| DE | 29706686 U1 | 6/1997 |

(Continued)

OTHER PUBLICATIONS

"International Application Serial No. PCT/US2017/022046, International Search Report dated Jun. 16, 2017", 3 pgs.

(Continued)

*Primary Examiner* — Jermie E Cozart
(74) *Attorney, Agent, or Firm* — Schwegman Lundberg & Woessner, P.A.

(57) ABSTRACT

A method of chamfering an aperture in a reel member of a tensioning system for an article of footwear is disclosed. The tensioning system includes a reel member configured to rotate about a central axis. The reel member includes a shaft and at least one flange disposed along the shaft. The flange includes an aperture extending through the flange. The aperture is configured to receive a lace. The reel member can tighten the tensioning system by winding the lace around portions of the shaft disposed on both sides of the at least one flange. The method of chamfering the aperture includes drilling through an end flange of the reel member to reach the center flange of the reel member in order to chamfer the aperture. The chamfered aperture can assist with sliding the lace through the aperture and distributing tension.

15 Claims, 19 Drawing Sheets

(51) Int. Cl.
  *B23B 51/10* (2006.01)
  *A43B 3/00* (2006.01)
  *B23C 3/02* (2006.01)
  *B23C 3/12* (2006.01)

(56) References Cited

U.S. PATENT DOCUMENTS

| | | |
|---|---|---|
| 3,970,268 A | 7/1976 | Sheetz |
| 4,022,398 A | 5/1977 | Youngblood |
| 4,602,822 A * | 7/1986 | Kim ............... B62K 25/02 280/229 |
| 4,659,032 A | 4/1987 | Rottleb |
| 4,660,300 A | 4/1987 | Morell et al. |
| 4,667,896 A | 5/1987 | Frey et al. |
| 5,173,013 A * | 12/1992 | Gorse ............... B23B 51/048 408/22 |
| 5,315,741 A | 5/1994 | Dubberke |
| 5,464,171 A | 11/1995 | Ripplinger |
| 5,791,574 A | 8/1998 | Hastings |
| 5,953,800 A | 9/1999 | Duckett |
| 6,502,286 B1 * | 1/2003 | Dubberke ............ A43C 7/00 24/712.1 |
| 6,513,742 B2 | 2/2003 | Watson |
| 6,851,191 B2 | 2/2005 | Arnetoli |
| 7,017,848 B2 | 3/2006 | Fleming |
| 7,490,790 B1 | 2/2009 | Gruber et al. |
| 7,584,528 B2 | 9/2009 | Hu |
| 7,752,774 B2 | 7/2010 | Ussher |
| 7,954,204 B2 | 6/2011 | Hammerslag et al. |
| 2002/0023984 A1 | 2/2002 | Oppmann et al. |
| 2015/0089835 A1 | 4/2015 | Hammerslag et al. |

FOREIGN PATENT DOCUMENTS

| | | |
|---|---|---|
| JP | H04246073 A | 9/1992 |
| JP | 2001104013 A | 4/2001 |
| WO | WO-2014036371 A1 | 3/2014 |
| WO | WO-2017160693 A2 | 9/2017 |

OTHER PUBLICATIONS

"International Application Serial No. PCT/US2017/022046, Written Opinion dated Jun. 16, 2017", 5 pgs.

"International Application Serial No. PCT/US2017/022046, International Preliminary Report on Patentability dated Sep. 27, 2018", 7 pgs.

* cited by examiner

METHOD OF FORMING AN APERTURE IN A REEL MEMBER OF A TENSIONING SYSTEM FOR AN ARTICLE OF FOOTWEAR

BACKGROUND

The present embodiments relate generally to articles of footwear including tensioning systems.

Articles of footwear generally include two primary elements: an upper and a sole structure. The upper is often formed from a plurality of material elements (e.g., textiles, polymer sheet layers, foam layers, leather, synthetic leather) that are stitched or adhesively bonded together to form a void on the interior of the footwear for comfortably and securely receiving a foot. More particularly, the upper forms a structure that extends over instep and toe areas of the foot, along medial and lateral sides of the foot, and around a heel area of the foot. The upper may also incorporate a lacing system to adjust the fit of the footwear, as well as permitting entry and removal of the foot from the void within the upper.

SUMMARY

In one aspect, the invention provides a method of chamfering an aperture in a reel member for use in a tensioning system. The method includes providing a reel member including a shaft and at least one flange extending radially outward from the shaft. The method also includes forming an aperture in the at least one flange. The method also includes chamfering an edge extending around a circumference of the aperture on at least one of a first face and a second face of the at least one flange.

In another aspect, the invention provides a method of forming an aperture in a reel member having a shaft and at least three flanges. The method includes providing a reel member including a shaft and at least three flanges extending radially outward from the shaft. The three flanges are spaced apart and can include a first end flange, a center flange, and a second end flange. The method also includes forming a through-hole in one of the first end flange and the second end flange. The method also includes forming an aperture in the center flange.

In another aspect, the invention provides a method of forming an aperture in a reel member for use in a tensioning system. The method includes providing a previously manufactured tensioning assembly having a reel member including a shaft and at least three flanges extending radially outward from the shaft. The three flanges can include a first end flange, a center flange, and a second end flange. The method also includes drilling a through-hole in one of the first end flange and the second end flange. The method also includes drilling an aperture in the center flange.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
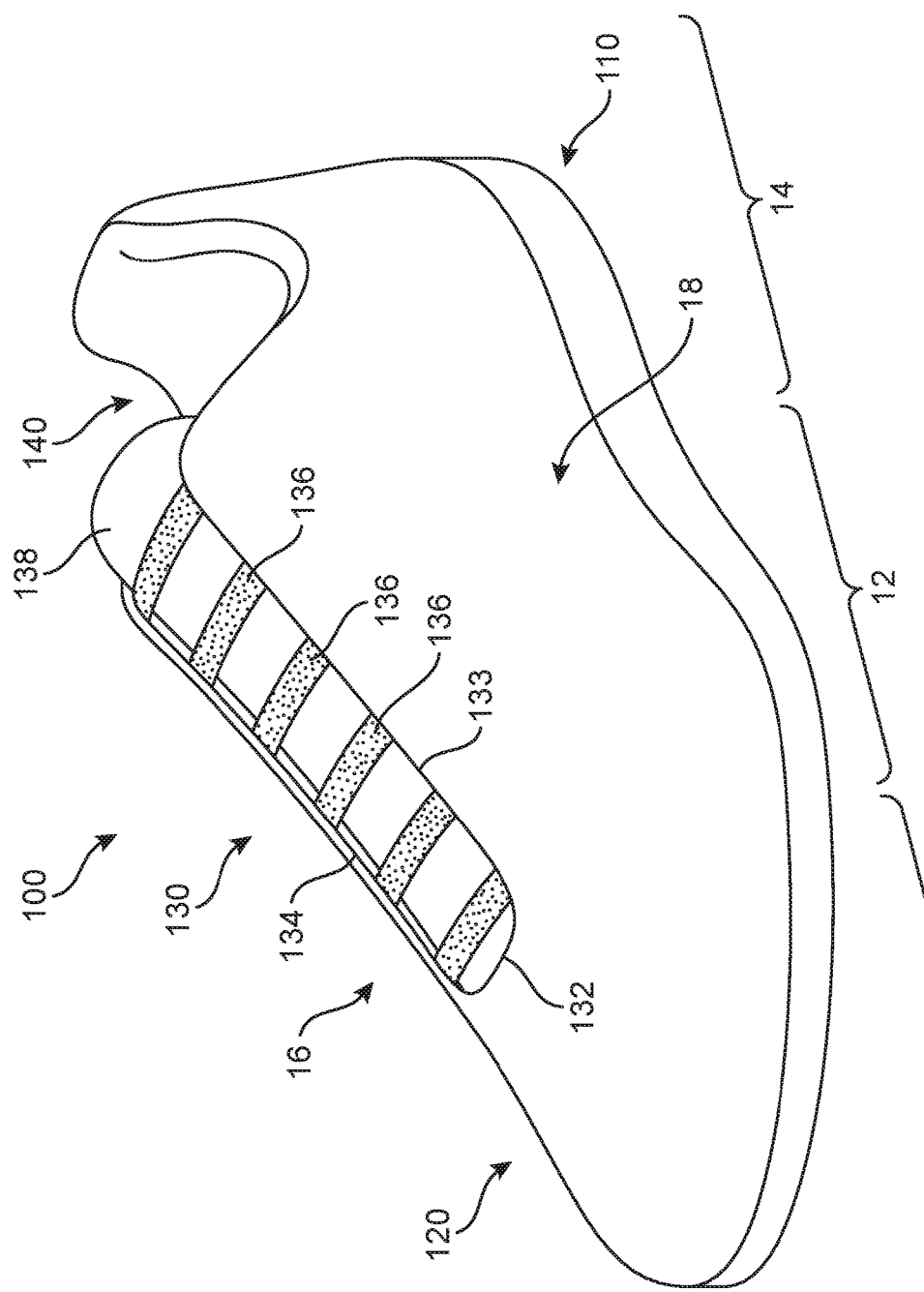
FIG. 1 is a schematic isometric view of an exemplary embodiment of an article of footwear including a tensioning system.

FIG. 1 illustrates a schematic isometric view of an exemplary embodiment of article of footwear 100 that is configured with a tensioning system 300. In the current embodiment, article of footwear 100, also referred to hereafter simply as article 100, is shown in the form of an athletic shoe. However, in other embodiments, tensioning system 300 may be used with any other kind of footwear including, but not limited to: hiking boots, soccer shoes, football shoes, sneakers, running shoes, cross-training shoes, rugby shoes, basketball shoes, baseball shoes as well as other kinds of shoes. Moreover, in some embodiments article 100 may be configured for use with various kinds of non-sports related footwear, including, but not limited to: slippers, sandals, high heeled footwear, loafers as well as any other kinds of footwear. As discussed in further detail below, a tensioning system may not be limited to footwear and in other embodiments a tensioning system could be used with various kinds of apparel, including clothing, sportswear, sporting equipment and other kinds of apparel. In still other embodiments, a tensioning system may be used with braces, such as medical braces.

Figure 2:
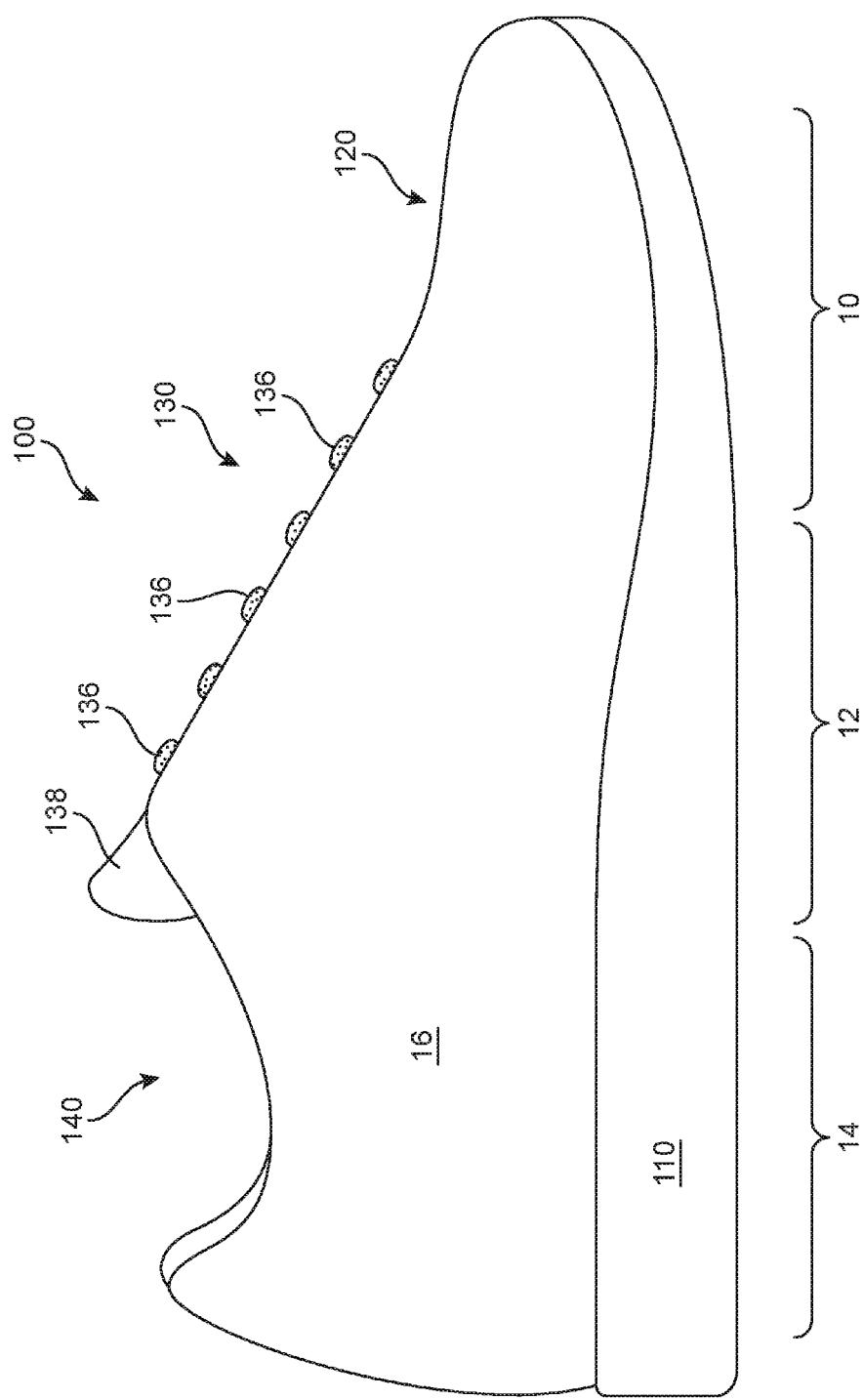
FIG. 2 is a schematic medial side view of the exemplary embodiment of an article of footwear including a tensioning system.

For reference purposes, article 100 may be divided into three general regions: a forefoot region 10, a midfoot region 12, and a heel region 14, as shown in FIGS. 1 and 2. Forefoot region 10 generally includes portions of article 100 corresponding with the toes and the joints connecting the metatarsals with the phalanges. Midfoot region 12 generally includes portions of article 100 corresponding with an arch area of the foot. Heel region 14 generally corresponds with rear portions of the foot, including the calcaneus bone. Article 100 also includes a medial side 16 and a lateral side 18, which extend through each of forefoot region 10, midfoot region 12, and heel region 14 and correspond with opposite sides of article 100. More particularly, medial side 16 corresponds with an inside area of the foot (i.e., the surface that faces toward the other foot), and lateral side 18 corresponds with an outside area of the foot (i.e., the surface that faces away from the other foot). Forefoot region 10, midfoot region 12, and heel region 14 and medial side 16, lateral side 18 are not intended to demarcate precise areas of article 100. Rather, forefoot region 10, midfoot region 12, and heel region 14, and medial side 16, lateral side 18 are intended to represent general areas of article 100 to aid in the following discussion. In addition to article 100, forefoot region 10, midfoot region 12, and heel region 14 and medial side 16, lateral side 18 may also be applied to a sole structure, an upper, and individual elements thereof.

For consistency and convenience, directional adjectives are also employed throughout this detailed description corresponding to the illustrated embodiments. The term "lateral" or "lateral direction" as used throughout this detailed description and in the claims refers to a direction extending along a width of a component or element. For example, a lateral direction of article 100 may extend between medial side 16 and lateral side 18. Additionally, the term "longitudinal" or "longitudinal direction" as used throughout this detailed description and in the claims refers to a direction extending across a length or breadth of an element or component (such as a sole structure or an upper). In some embodiments, a longitudinal direction of article 100 may extend from forefoot region 10 to heel region 14. It will be understood that each of these directional adjectives may also be applied to individual components of an article of footwear, such as an upper and/or a sole structure. In addition, a vertical direction refers to a direction perpendicular to a horizontal surface defined by the longitudinal direction and the lateral direction. It will be understood that each of these directional adjectives may be applied to various components shown in the embodiments, including article 100, as well as components of a tensioning system 300.

In some embodiments, article of footwear 100 may include a sole structure 110 and an upper 120. Generally, upper 120 may be any type of upper. In particular, upper 120 may have any design, shape, size and/or color. For example, in embodiments where article 100 is a basketball shoe, upper 120 could be a high top upper that is shaped to provide high support on an ankle. In embodiments where article 100 is a running shoe, upper 120 could be a low top upper.

In some embodiments, sole structure 110 may be configured to provide traction for article 100. In addition to providing traction, sole structure 110 may attenuate ground reaction forces when compressed between the foot and the ground during walking, running or other ambulatory activities. The configuration of sole structure 110 may vary significantly in different embodiments to include a variety of conventional or non-conventional structures. In some cases, the configuration of sole structure 110 can be configured according to one or more types of ground surfaces on which sole structure 110 may be used. Examples of ground surfaces include, but are not limited to: natural turf, synthetic turf, dirt, as well as other surfaces.

In different embodiments, sole structure 110 may include different components. For example, sole structure 110 may include an outsole, a midsole, and/or an insole. In addition, in some cases, sole structure 110 can include one or more cleat members or traction elements that are configured to increase traction with a ground surface.

In an exemplary embodiment, sole structure 110 is secured to upper 120 and extends between the foot and the ground when article 100 is worn. Upper 120 defines an interior void within article 100 for receiving and securing a foot relative to sole structure 110. The void is shaped to accommodate the foot and extends along a lateral side of the foot, along a medial side of the foot, over the foot, around the heel, and under the foot. Upper 120 may also include a collar that is located in at least heel region 14 and forms a throat opening 140. Access to the interior void of upper 120 is provided by throat opening 140. More particularly, the foot may be inserted into upper 120 through throat opening 140, and the foot may be withdrawn from upper 120 through throat opening 140.

In some embodiments, article 100 can include a lacing system 130. Lacing system 130 extends forward from the collar and throat opening 140 in heel region 14 over a lacing area 132 corresponding to an instep of the foot in midfoot region 12 to an area adjacent to forefoot region 10. Lacing area 132 extends between a lateral edge 133 and a medial edge 134 on opposite sides of upper 120. Lacing system 130 includes various components configured to secure a foot within upper 120 of article 100 and, in addition to the components illustrated and described herein, may further include additional or optional components conventionally included with footwear uppers.

In this embodiment, a plurality of strap members 136 extends across portions of lacing area 132. Together with tensioning system 300 (described in detail below), plurality of strap members 136 assist the wearer to modify dimensions of upper 120 to accommodate the proportions of the foot. In the exemplary embodiments, plurality of strap members 136 extend laterally across lacing area 132 between lateral edge 133 and medial edge 134. As will be further described below, strap members 136 and a lace 340 of tensioning system 300 permit the wearer to tighten upper 120 around the foot, and to loosen upper 120 to facilitate entry and removal of the foot from the interior void (i.e., through throat opening 140).

In some embodiments, upper 120 includes a tongue 138 that extends over a foot of a wearer when disposed within article 100 to enhance the comfort of article 100. In this embodiment, tongue 138 extends through lacing area 132 and can move within an opening between opposite lateral edge 133 and medial edge 134 of upper 120. In some cases, tongue 138 can extend between a lace and/or strap members 136 to provide cushioning and disperse tension applied by the lace or strap members 136 against a top of a foot of a wearer. With this arrangement, tongue 138 can enhance the comfort of article 100.

Some embodiments may include provisions for facilitating the adjustment of an article to a wearer's foot, including tightening and/or loosening the article around the wearer's foot. In some embodiments, these provisions may include a tensioning system. In some embodiments, a tensioning system may further include other components that include, but are not limited to, a tensioning member, lacing guides, a tensioning assembly, a housing unit, a motor, gears, spools or reels, and/or a power source. Such components may assist in securing, adjusting tension, and providing a customized fit to a wearer's foot. These components and how, in various embodiments, they may secure the article to a wearer's foot, adjust tension, and provide a customized fit will be explained further in detail below.

Figure 3:
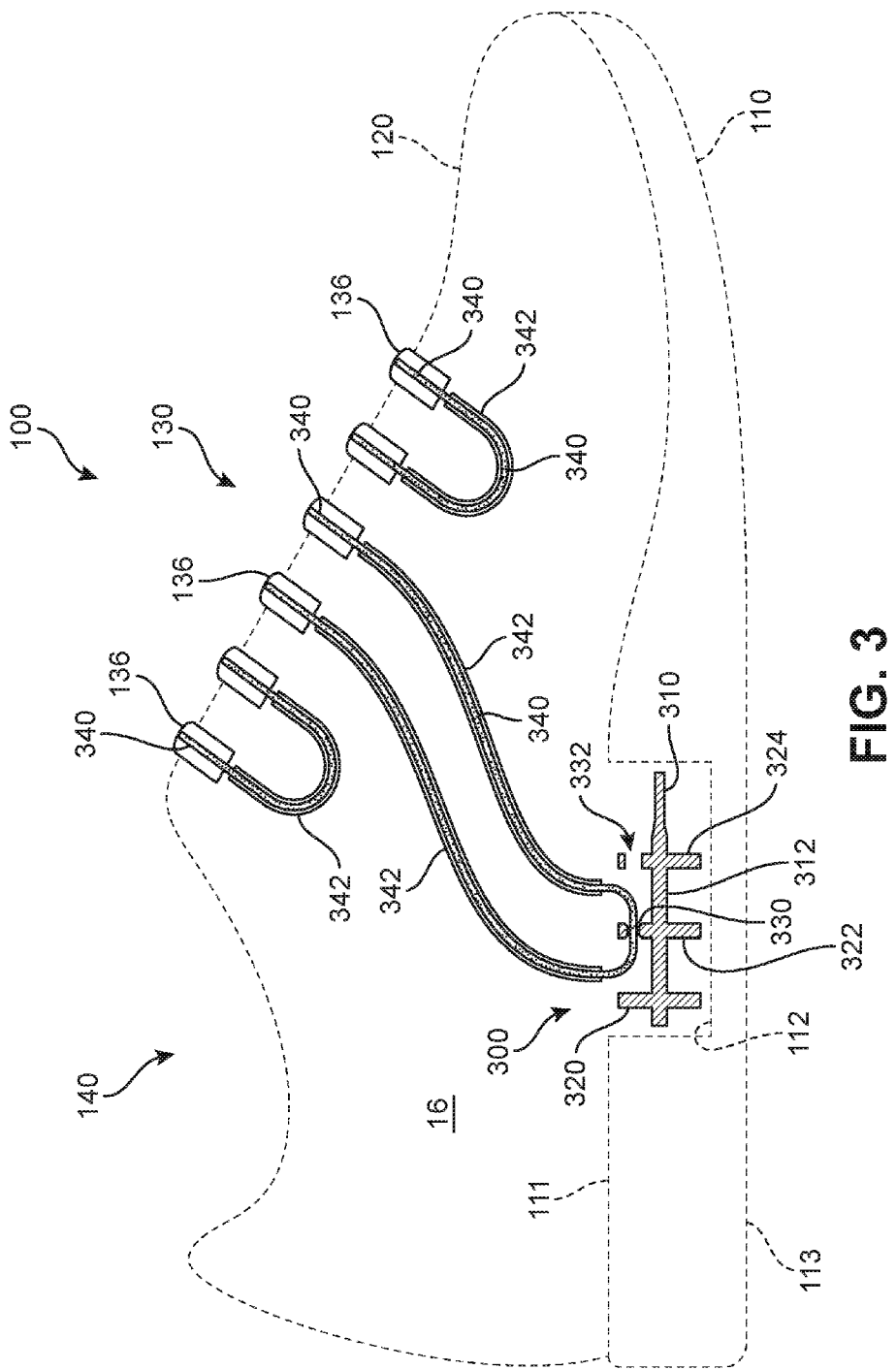
FIG. 3 is a schematic medial side view of an exemplary embodiment of a tensioning system with the article of footwear shown in phantom.

Referring now to FIG. 3, article 100 includes an exemplary embodiment of a tensioning system 300. Embodiments of tensioning system 300 may include any suitable tensioning system, including incorporating any of the systems disclosed in one or more of Beers et al., U.S. Patent Application Publication Number 2014/0068838, now U.S. application Ser. No. 14/014,491, filed Aug. 20, 2013, and titled "Motorized Tensioning System"; Beers, U.S. Patent Application Publication Number 2014/0070042, now U.S. application Ser. No. 14/014,555, filed Aug. 20, 2013 and titled "Motorized Tensioning System with Sensors"; and Beers, U.S. Patent Application Publication Number 2014/0082963, now U.S. application Ser. No. 14/032,524, filed Sep. 20, 2013 and titled "Footwear Having Removable Motorized Adjustment System"; which applications are hereby incorporated by reference in their entirety (collectively referred to herein as the "Automatic Lacing cases").

In different embodiments, a tensioning system may include a tensioning member. The term "tensioning member" as used throughout this detailed description and in the claims refers to any component that has a generally elongated shape and high tensile strength. In some cases, a tensioning member could also have a generally low elasticity. Examples of different tensioning members include, but are not limited to: laces, cables, straps and cords. In some cases, tensioning members may be used to fasten and/or tighten an article, including articles of clothing and/or footwear. In other cases, tensioning members may be used to apply tension at a predetermined location for purposes of actuating some components or system.

In an exemplary embodiment, tensioning system 300 includes a tensioning member in the form of a lace 340. Lace 340 is configured to modify the dimensions of the interior void of upper 120 and to thereby tighten (or loosen) upper 120 around a wearer's foot. In one embodiment, lace 340 may be configured to move plurality of strap members 136 of lacing system 130 so as to bring opposite lateral edge 133 and medial edge 134 of lacing area 132 closer together to tighten upper 120. Similarly, lace 340 may also be configured to move plurality of strap members 136 in the opposite direction to move lateral edge 133 and medial edge 134 further apart to loosen upper 120. With this arrangement, lace 340 may assist with adjusting tension and/or fit of article 100.

In some embodiments, lace 340 may be connected or joined to strap members 136 so that movement of lace 340 is communicated to plurality of strap members 136. For example, lace 340 may be bonded, stitched, fused, or attached using adhesives or other suitable mechanisms to attach portions of lace 340 extending across lacing area 132 to each strap member of plurality of strap members 136. With this arrangement, when tension is applied to lace 340 via tensioning system 300 to tighten or loosen lacing system 130, lace 340 can move strap members 136 between an open or closed position.

In some embodiments, lace 340 may be configured to pass through various lacing guides 342 that route lace 340 across portions of upper 120. In some cases, ends of lacing guides 340 may terminate adjacent to lateral edge 133 and medial edge 134 of lacing area 132. In some cases, lacing guides 342 may provide a similar function to traditional eyelets on uppers. In particular, as lace 340 is pulled or tensioned, lacing area 132 may generally constrict so that upper 120 is tightened around a foot. In one embodiment, lacing guides 342 may be routed or located between layers of the material forming upper 120, including any interior layers or linings.

Figure 4:
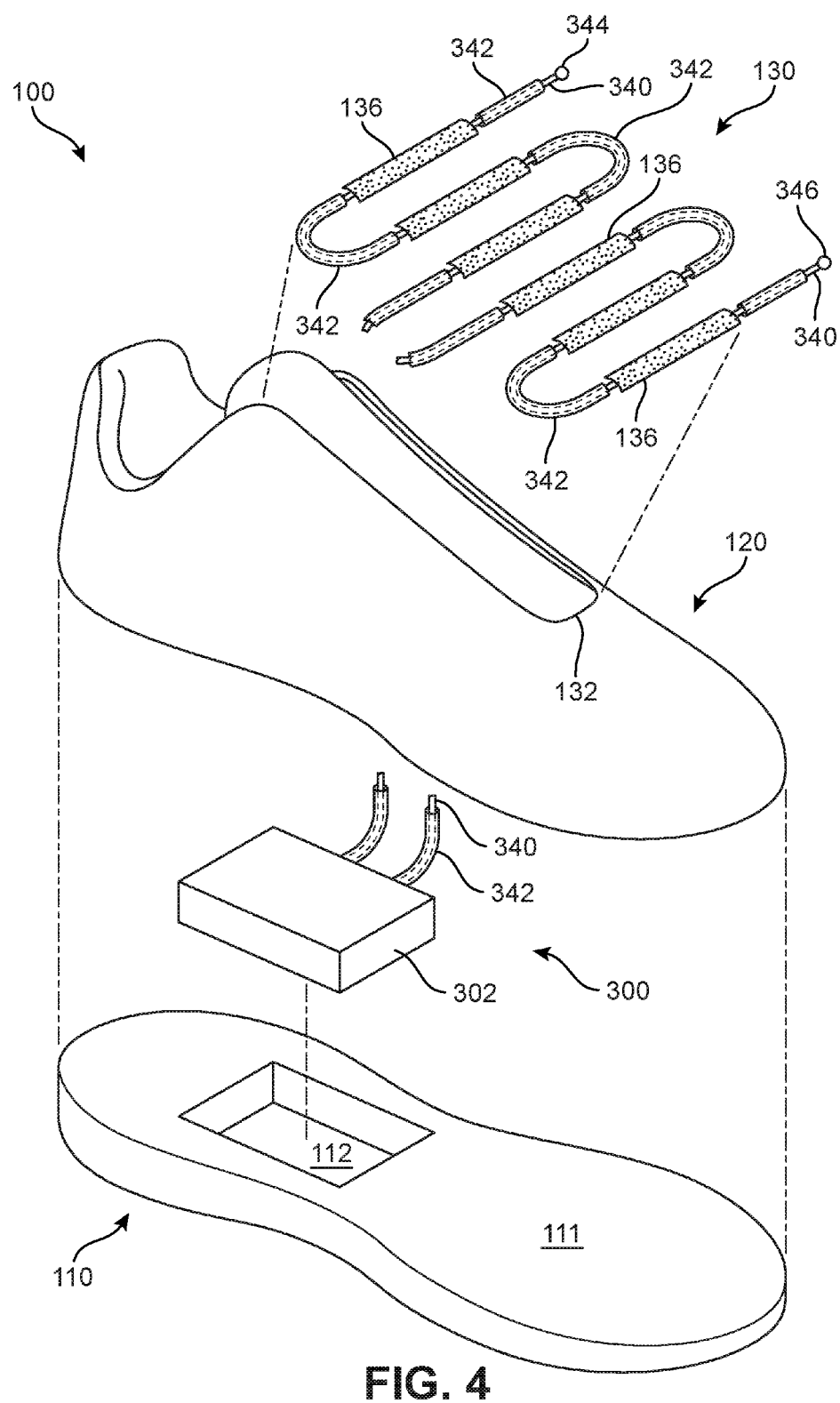
FIG. 4 is a schematic exploded view of the exemplary embodiment of an article of footwear including a tensioning system.
Figure 5:
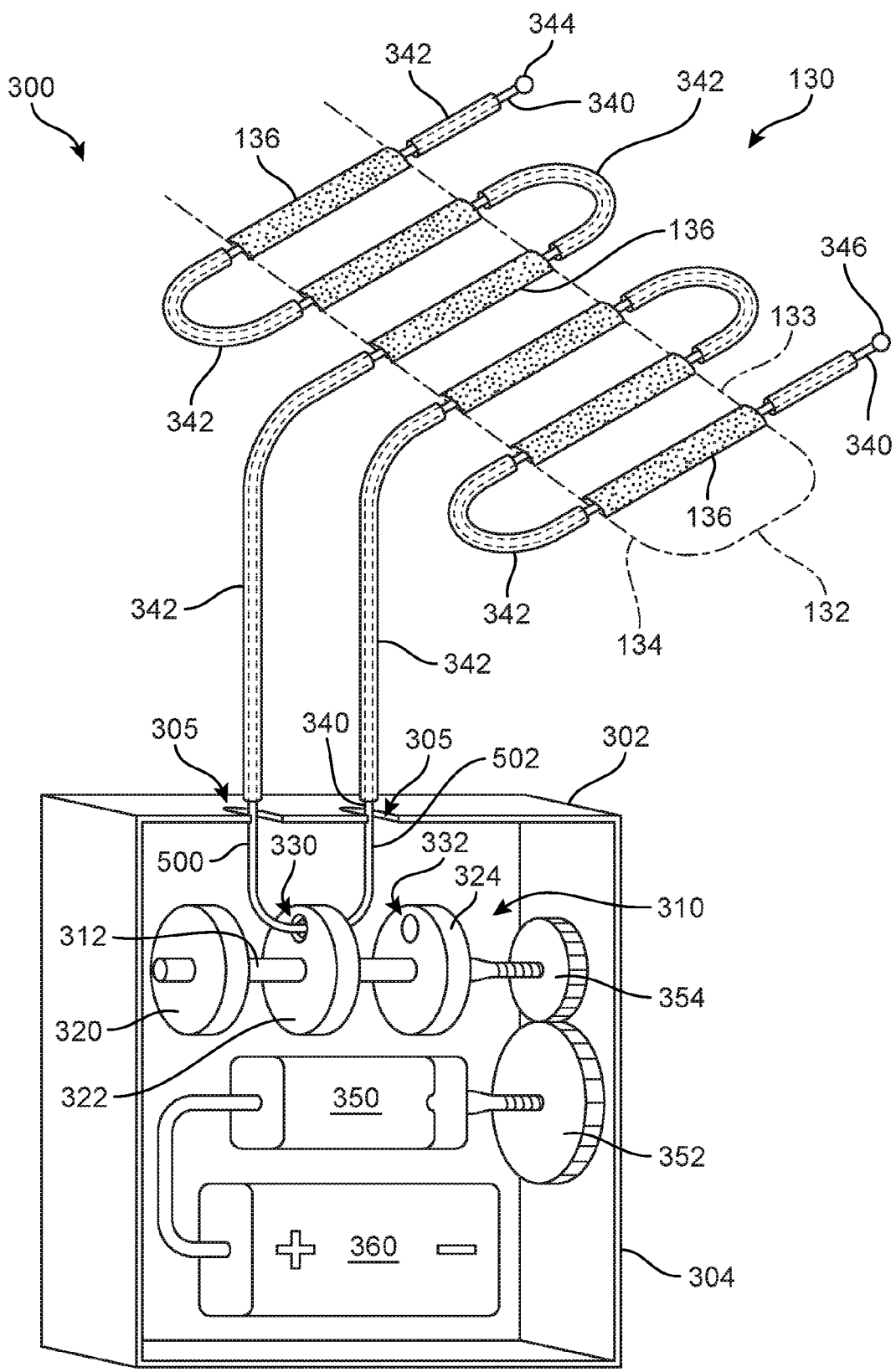
FIG. 5 is a representative exploded view of the exemplary embodiment of a tensioning system including a reel member.

In some embodiments, lacing guides 342 may be used to arrange lace 340 in a predetermined configuration on upper 120 of article 100. Referring to FIGS. 3-5, in one embodiment, lace 340 is arranged in a serpentine or alternating sides configuration on upper 120. In some other embodiments, lace 340 may be arranged, via lacing guides 342, in different configurations.

In some embodiments, tensioning system 300 includes a reel member 310. Reel member 310 is a component within a tensioning assembly 302 of tensioning system 300. Reel member 310 is configured to be rotated around a central axis in opposite directions to wind and/or unwind lace 340 and thereby tighten or loosen tensioning system 300.

In an exemplary embodiment, reel member 310 is a reel or spool having a shaft 312 running along the central axis and a plurality of flanges extending radially outward from shaft 312. The plurality of flanges can have a generally circular or round shape with shaft 312 disposed within the center of each flange. The flanges assist with keeping the wound portions of lace 340 separated and organized on reel member 310 so that lace 340 does not become tangled or bird-nested during winding or unwinding when tensioning system 300 is tightened or loosened.

In an exemplary embodiment, reel member 310 may include a center flange 322 located approximately at a midpoint along shaft 312 of reel member 310. Center flange 322 may include an aperture 330 that forms an opening extending between opposite faces of center flange 322. Aperture 330 is configured to receive lace 340. As shown in FIG. 3, lace 340 extends through aperture 330 in center flange 322 from one side or face of center flange 322 to the other side or opposite face. With this arrangement, portions of lace 340 are disposed on opposite sides of center flange 322 and lace 340 is interconnected to reel member 310.

In one embodiment, reel member 310 may include at least three flanges on shaft 312 that are spaced apart from one another. In this embodiment, reel member 310 includes a first end flange 320, center flange 322, and a second end flange 324. Center flange 322 is located along shaft 312 between first end flange 320 and second end flange 324. First end flange 320 and second end flange 324 are located on shaft 312 at opposite ends of reel member 310 on either side of center flange 322. First end flange 320 and/or second end flange 324 may assist with keeping portions of lace 340 that are wound on reel member 310 from sliding off the ends of reel member 310 and may also assist with preventing lace 340 from becoming tangled or bird-nested during winding or unwinding when tensioning system 300 is tightened or loosened.

In an exemplary embodiment, aperture 330 in center flange 322 may be formed according to the exemplary process described in detail below. As part of the exemplary process of forming aperture 330 in center flange 322, a through-hole may be made in one of the other flanges on reel member 310 to permit access to center flange 322 from one side or the other. That is, when aperture 330 is drilled into center flange 322, the drill may approach one side or face of center flange 322 from either end of reel member 310. As a result, to reach center flange 322 from this direction, the drill will form the through-hole in one of the end flanges to allow the drill to continue towards center flange 322.

In some embodiments, one of first end flange 320 and second end flange 324 may include a through-hole 332 extending between opposite sides or faces of the flange. In this embodiment, second end flange 324 of reel member 310 includes through-hole 332. As will be described below, through-hole 332 is formed during the exemplary process of forming aperture 330 in center flange 322. It should be understood that through-hole 332 is depicted in the exemplary embodiment as being formed in second end flange 324, however, the process of forming aperture 330 in center flange 322 may alternatively be made from the opposite end of reel member 310, thereby forming through-hole 332 in first end flange 320 instead of second end flange 324.

In some embodiments, tensioning assembly 302 of tensioning system 300 may be located within a cavity 112 in sole structure 110. Sole structure 110 can include an upper surface 111 that is disposed adjacent to upper 120 on a top of sole structure 110. Upper surface 111 may be directly or indirectly attached or joined to upper 120 or a component of upper 120 to secure sole structure 110 and upper 120 together. Sole structure 110 may also include a lower surface or ground-engaging surface 113 that is disposed opposite upper surface 111. Ground-engaging surface 113 may be an outsole or other component of sole structure 110 that is configured to be in contact with a ground surface when article 100 is worn.

In an exemplary embodiment, cavity 112 is an opening in sole structure extending from upper surface 111 towards lower surface 113. Tensioning assembly 302 of tensioning system 300 may be inserted within cavity 112 from the top of sole structure 110. In an exemplary embodiment, cavity 112 has an approximately rectangular shape that corresponds with a rectangular shape of tensioning assembly 302. In addition, cavity 112 may be of a similar size and dimension as tensioning assembly 302 so that tensioning assembly 302 conformably fits within cavity 112. With this arrangement, tensioning assembly 302 and related components may be protected from contact with a ground surface by lower surface 113 when article 100 is worn.

Referring now to FIG. 4, an exploded view of article 100, including sole structure 110, upper 120, lacing system 130, and tensioning system 300 are illustrated. In this embodiment, the configuration of lace 340 through lacing guides 342 can be seen alternately extending across lacing area 132 of upper 120 between medial edge 134 on medial side 16 and lateral edge 133 on lateral side 18.

In addition, to facilitate lace 340 being able to tighten and loosen tensioning system 300, ends of lace 340 are anchored to upper 120 at different locations. As shown in FIG. 4, a first anchor 344 secures one end of lace 340 to upper 120 near or adjacent to throat opening 140 in heel region 14 of upper 120 and a second anchor 346 secures the opposite end of lace 340 to upper 120 near or adjacent to forefoot region 10. First anchor 344 and second anchor 346 may be attached or joined to upper 120 may any suitable mechanism, including, but not limited to, knotting, bonding, sewing, adhesives, or other forms of attachment.

FIG. 5 illustrates an exploded view of an exemplary embodiment of components of tensioning system 300 including reel member 310 and lace 340. In some embodiments, tensioning system 300 can include tensioning assembly 302 that is configured to adjust the tension of components of lacing system 130, including lace 340 and/or strap members 136, to secure, adjust, and modify the fit of article 100 around a wearer's foot. Tensioning assembly 302 may be any suitable device for adjusting tension of a tensioning member, such as a lace or strap, and can include any of the devices or mechanisms described in the Automatic Lacing cases described above.

Referring to FIG. 5, some components of tensioning assembly 302 are shown within a portion of a housing unit 304. In some embodiments, housing unit 304 may be shaped so as to optimize the arrangement of components of tensioning assembly 302. In one embodiment, tensioning assembly 302 includes housing unit 304 that has an approximately rectangular shape. However, it should be understood that the shape and configuration of housing unit 304 may be modified in accordance with the type and configuration of tensioning assembly used within tensioning system 300.

In this embodiment, tensioning assembly 302 includes reel member 310 that is mechanically coupled to a motor 350. In some embodiments, motor 350 could include an electric motor. However, in other embodiments, motor 350 could comprise any kind of non-electric motor known in the art. Examples of different motors that can be used include, but are not limited to: DC motors (such as permanent-magnet motors, brushed DC motors, brushless DC motors, switched reluctance motors, etc.), AC motors (such as motors with sliding rotors, synchronous electrical motors, asynchronous electrical motors, induction motors, etc.), universal motors, stepper motors, piezoelectric motors, as well as any other kinds of motors known in the art.

Motor 350 may further include a crankshaft 352 that can be used to drive one or more components of tensioning assembly 302. For example, a gear 354 may be mechanically coupled to reel member 310 and may be driven by crankshaft 352 of motor 350. With this arrangement, reel member 310 may be placed in communication with motor 350 to be rotated in opposite directions around a central axis.

For purposes of reference, the following detailed description uses the terms "first rotational direction" and "second rotational direction" in describing the rotational directions of one or more components about a central axis. For purposes of convenience, the first rotational direction and the second rotational direction refer to rotational directions about central axis of shaft 312 of reel member 310 and are generally opposite rotational directions. The first rotational direction may refer to the counterclockwise rotation of a component about the central axis, when viewing the component from the vantage point of a first end 600 of shaft 312. The second rotational direction may be then be characterized by the clockwise rotation of a component about the central axis, when viewing the component from the same vantage point.

In some embodiments, tensioning assembly 302 may include provisions for powering motor 350, including a power source 360. Power source 360 may include a battery and/or control unit (not shown) configured to power and control tensioning assembly 302 and motor 350. Power source 360 may be any suitable battery of one or more types of battery technologies that could be used to power motor 350 and tensioning assembly 302. One possibly battery technology that could be used is a lithium polymer battery. The battery (or batteries) could be rechargeable or replaceable units packaged as flat, cylindrical, or coin shaped. In addition, batteries could be single cell or cells in series or parallel. Other suitable batteries and/or power sources may be used for power source 360.

In the embodiments shown, motor 350, power source 360, reel member 310, crankshaft 352, and gear 354 are all disposed in housing unit 304, along with additional components, such as control unit or other elements, which may function to receive and protect all of these components within tensioning assembly 302. In other embodiments, however, any one or more of these components could be disposed in any other portions of an article, including the upper and/or sole structure.

Housing unit 304 includes openings 305 that permit lace 340 to enter into tensioning assembly 302 and engage reel member 310. As discussed above, lace 340 extends through aperture 330 in center flange 322 of reel member 310 to interconnect lace 340 with reel member 310. When lace 340 is disposed through aperture 330 of center flange 322, lace 340 may include a first lace portion 500 located on one side of center flange 322 and a second lace portion 502 located on the opposite side of center flange 322. Accordingly, openings 305 in housing unit 304 allow both first lace portion 500 and second lace portion 502 of lace 340 to wind and unwind around reel member 310 within the inside of housing unit 304 of tensioning assembly 302.

Figure 6:
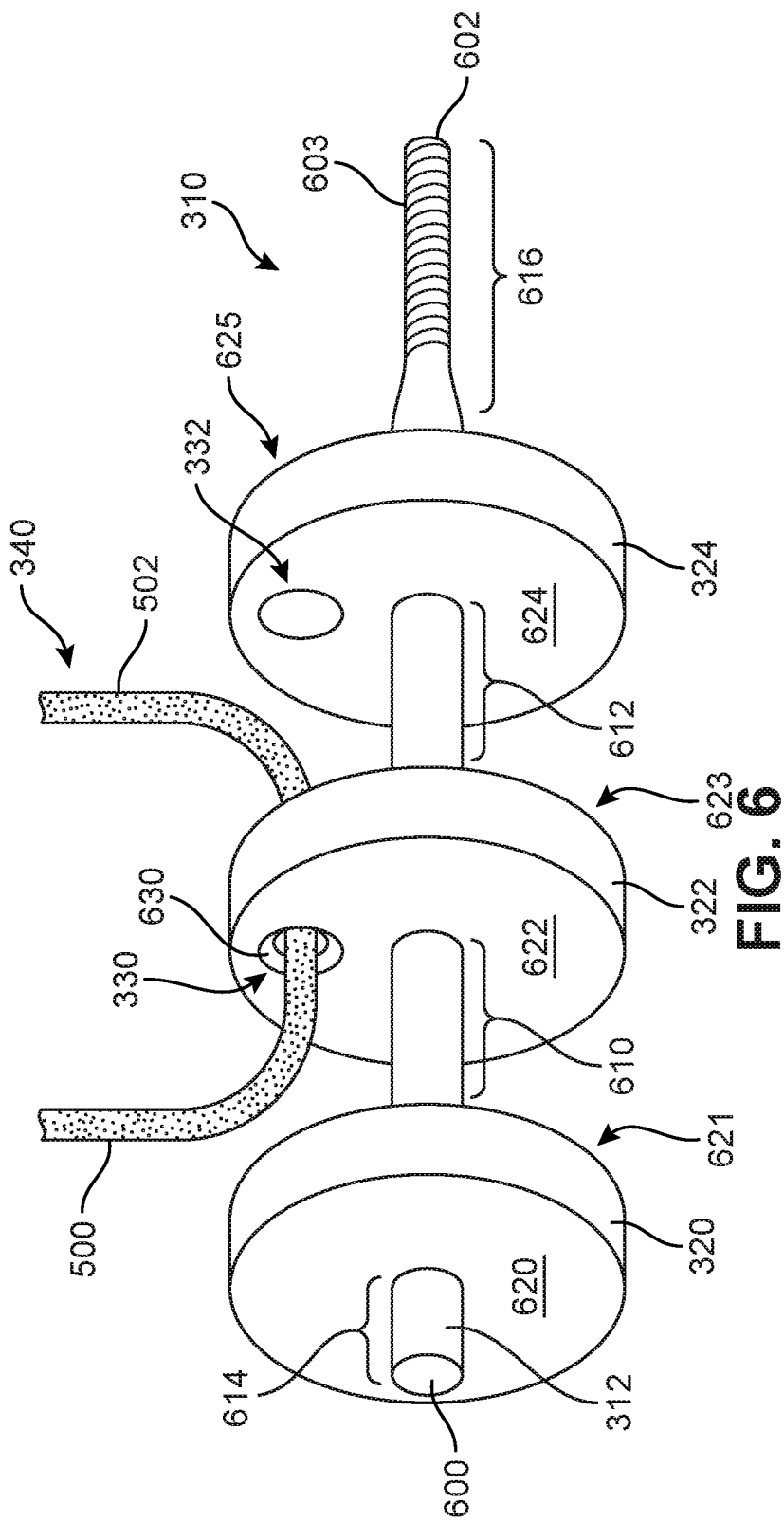
FIG. 6 is a schematic enlarged view of an exemplary embodiment of a reel member with a chamfered aperture included within a tensioning system.

Referring now to FIG. 6, an enlarged view of an exemplary embodiment of reel member 310 is illustrated. In this embodiment, reel member 310 has a central axis that extends along a longitudinal length of reel member 310 from a first end 600 to a second end 602. As described above, reel member 310 is configured to rotate about the central axis in a first rotational direction and an opposite second rotational direction to wind or unwind lace 340 around portions of shaft 312. In addition, reel member 310 may include a screw 603 disposed at second end 602 that is configured to engage with one or more gear assembly components, including gear 354 and/or crankshaft 352, so as to be in communication with motor 350. With this configuration, motor 350 may rotate reel member 310 about the central axis in the first rotational direction and the second rotational direction.

In some embodiments, portions of shaft 312 of reel member 310 may be described with reference to the plurality of flanges extending away from shaft 312. For example, a first shaft section 610 extends between first end flange 320 and center flange 322 and a second shaft section 612 extends between second end flange 324 and center flange 322. Shaft 312 may also include a third shaft section 614 extending from first end flange 320 to first end 600 and a fourth shaft section 616 extending from second end flange 324 to second end 602. In some embodiments, screw 603 may be disposed on fourth shaft section 616.

In some embodiments, each of the plurality of flanges has two opposing faces with surfaces that are oriented towards opposite ends of reel member 310. For example, first end flange 320 has an outer face 620 having a surface oriented towards first end 600 of shaft 310 and an opposite inner face 621 having a surface oriented towards second end 602. Similarly, second end flange 324 has an outer face 625 having a surface oriented towards second end 602 and an opposite inner face 624 having a surface oriented towards first end 600 of shaft 310. Center flange 322 includes a first face 622 and an opposite second face 623. First face 622 of center flange 322 has a surface oriented towards first end 600 of shaft 312 and facing inner face 621 of first end flange 320. Second face 623 of center flange 322 has a surface oriented towards second end 602 of shaft 312 and facing inner face 624 of second end flange 324.

In an exemplary embodiment, center flange 322 includes aperture 330, described above. Aperture 330 extends between first face 622 and second face 623 of center flange 322 and provides an opening that allows lace 340 to extend between the opposite sides or faces of center flange 322. In some embodiments, center flange 322 extends radially outward from shaft 312 and aperture 330 is located on center flange 322 so as to be spaced apart from shaft 312. In this embodiment, aperture 330 is located adjacent to a perimeter edge of center flange 322. In different embodiments, the distance between the perimeter edge of center flange 322 and the location of aperture 330 may vary. For example, the distance may be determined on the basis of revolution rate of tensioning assembly 302 and/or motor 350 or may be determined on the basis of the desired tension within tensioning system 300.

In some embodiments, second end flange 324 may include through-hole 332, described above. Through-hole 332 extends between inner face 624 and outer face 625 of second end flange 324 and provides an opening that permits components of a drill or other suitable instrument to access center flange 322 for the purpose of forming aperture 330. In some embodiments, second end flange 324 extends radially outward from shaft 312 and through-hole 332 is located on second end flange 324 so as to be spaced apart from shaft 312. In this embodiment, through-hole 332 is located adjacent to a perimeter edge of second end flange 324. In different embodiments, the distance between the perimeter edge of second end flange 324 and the location of through-hole 332 may vary. For example, the distance may be determined on the basis of the desired location of aperture 330. In some cases, through-hole 332 may be aligned with aperture 330 in a direction parallel to the central axis of reel member 310.

As shown in FIG. 6, when lace 340 extends through aperture 330 in center flange 322, lace 340 can include a first lace portion 500 disposed on one side of center flange 322 and a second lace portion 502 disposed on the opposite side of center flange 322. In this embodiment, first lace portion 500 is disposed on the side of center flange 322 that corresponds with first face 622 and second lace portion 502 is disposed on the side of center flange 322 that corresponds with second face 623. With this arrangement, lace 340 may be interconnected to reel member 310.

As will be further described below, reel member 310 is operable to be rotated in the first rotational direction or the second rotational direction to wind or unwind lace 340 and thereby tighten or loosen tensioning system 300. For example, motor 350 and/or an associated control unit of tensioning system 300 can be used to control rotation of reel member 310, including automatic operation and/or based on user inputs. When tensioning system 300 is tightened, reel member 310 rotates while lace 340 is interconnected to center flange 322 at aperture 330. This rotation causes first lace portion 500 and second lace portion 502 to be wound onto portions of shaft 312 on opposite sides of center flange 322. Specifically, first lace portion 500 is wound onto first shaft section 610 and second lace portion 502 is wound onto second shaft section 612.

In this embodiment, first face 622 of center flange 322 and inner face 621 of first end flange 320 serve as boundaries or walls on the ends of first shaft section 610 to assist with keeping first lace portion 500 located on first shaft section 610 of reel member 310 during winding and unwinding of lace 340 with tensioning assembly 302. In a similar manner, second face 623 of center flange 322 and inner face 624 of second end flange 324 serve as boundaries or walls on the ends of second shaft section 612 to assist with keeping second lace portion 502 located on second shaft section 612 of reel member 310 during winding and unwinding of lace 340 with tensioning assembly 302. With this arrangement, lace 340, including first lace portion 500 and second lace portion 502, may be prevented from getting tangled or bird-nested during operation of tensioning system 300.

Figure 7:
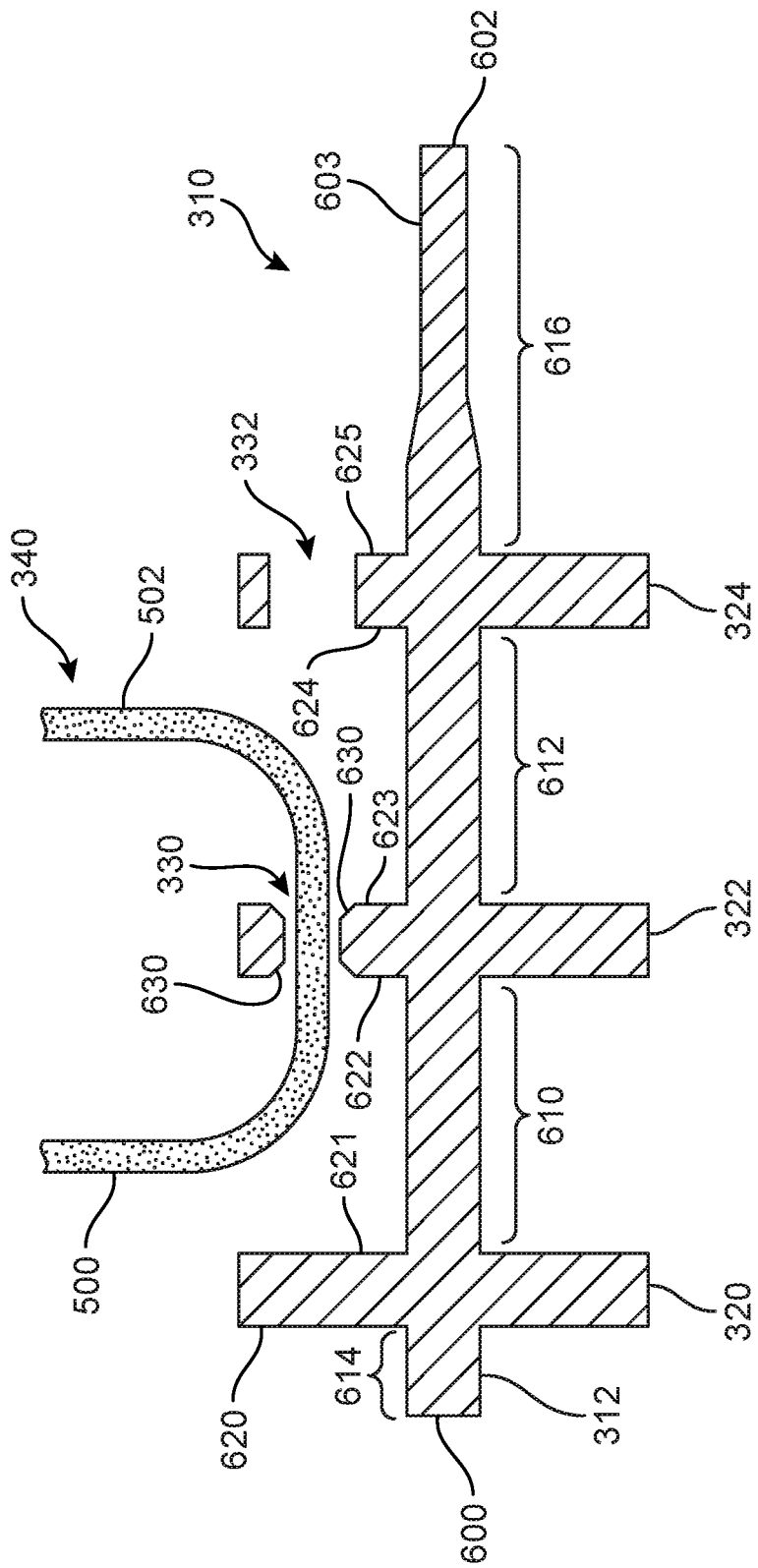
FIG. 7 is a cross-sectional view of the exemplary embodiment of a reel member with a chamfered aperture.

FIG. 7 illustrates a cross-sectional view of reel member 310 and shows the interconnection of lace 340 with reel member 310 within tensioning system 300. In this embodiment, first lace portion 500 of lace 340 extends through aperture 330 in the surface of first face 624 of center flange 322 and second lace portion 502 of lace 340 outwards from aperture 330 in the surface of second face 623 on the opposite side of center flange 322. With this arrangement, lace 340 is interconnected to reel member 310 via aperture 330 in center flange 322 such that rotation of reel member 310 about the central axis will cause first lace portion 500 and second lace portion 502 to respectively wind about first shaft section 610 and second shaft section 612.

Figure 8:
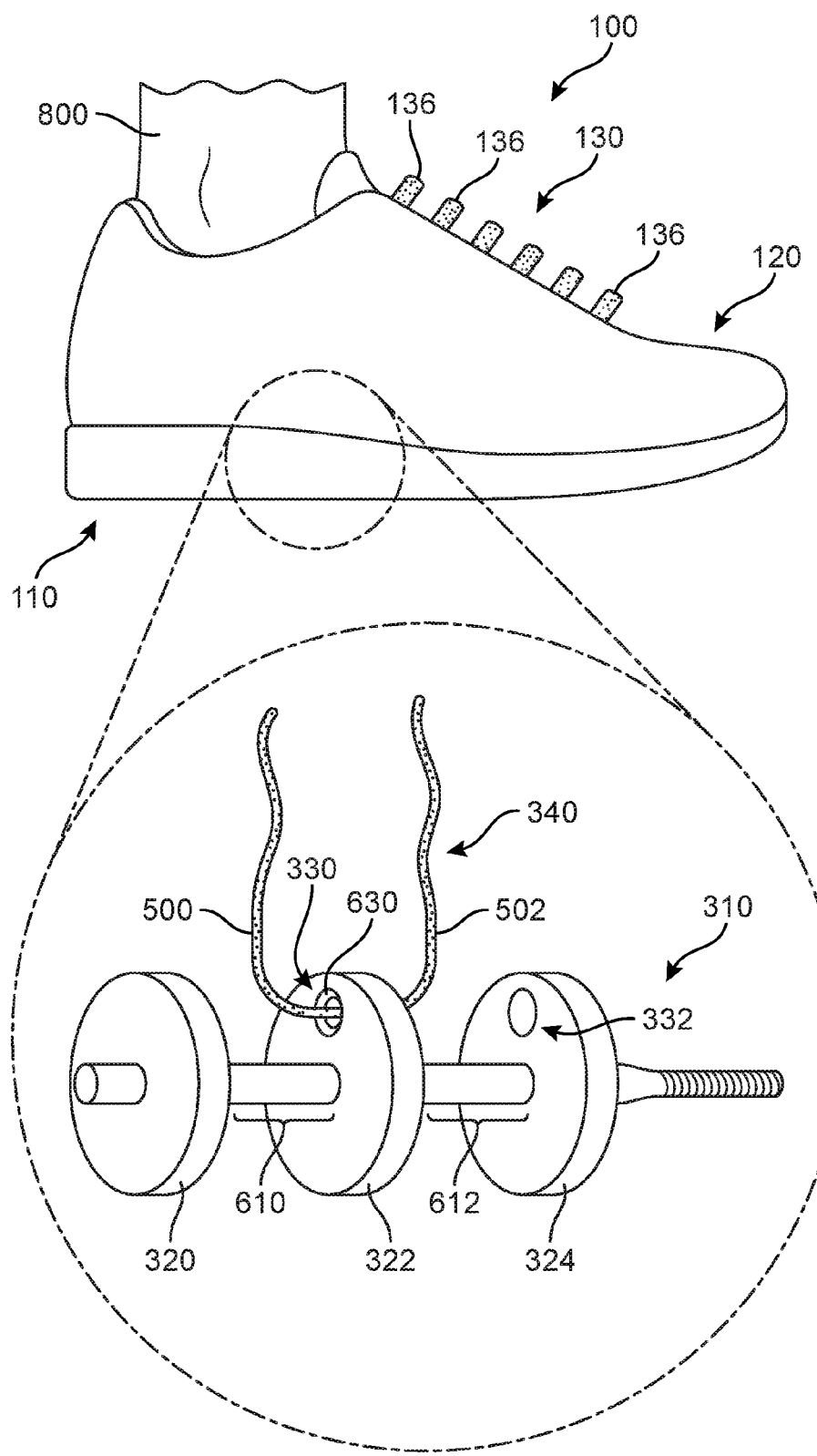
FIG. 8 is a representative view of an exemplary embodiment of a tensioning system in a loosened condition.
Figure 9:
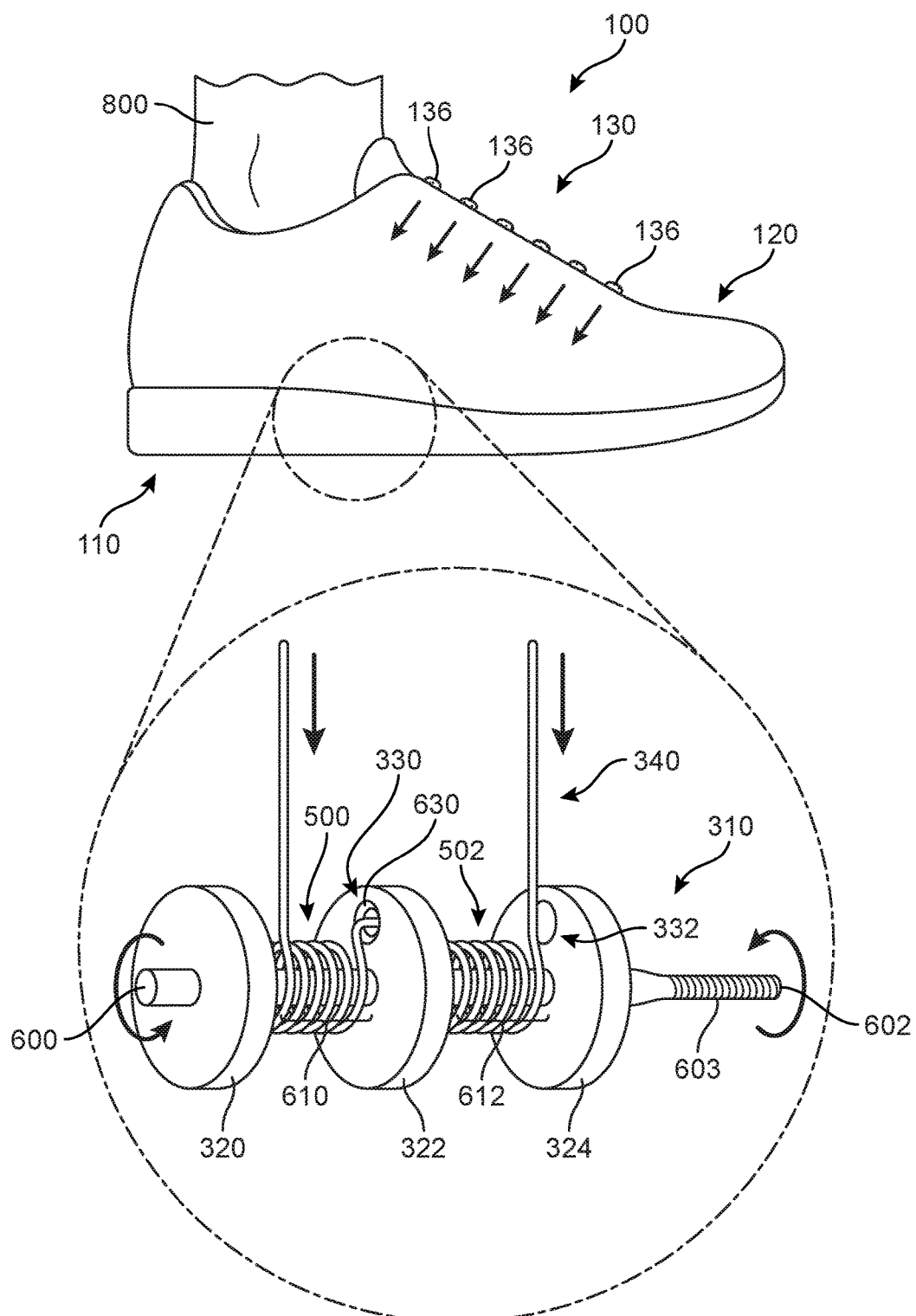
FIG. 9 is a representative view of an exemplary embodiment of a tensioning system in a tightened condition.

In some embodiments, tensioning system 300 is operable to be controlled between at least a tightened condition and a loosened condition. In different embodiments, however, it should be understood that tensioning system 300 may be controlled to be placed into various degrees or amounts of tension that range between a fully tightened and a fully loosened condition. In addition, tensioning system 300 may include predetermined tension settings or user-defined tension settings. FIGS. 8 and 9 illustrate exemplary embodiments of tensioning system 300 being operated between a loosened condition (FIG. 8) and a tightened condition (FIG. 9). It should be understood that the method of tightening and/or loosening tensioning system 300 using tensioning assembly 302 may be performed in reverse order to loosen tensioning system 300 from the tightened condition to the loosened condition.

Referring now to FIG. 8, an exemplary embodiment of tensioning system 300 in a loosened condition is illustrated. In this embodiment, a foot 800 of a wearer is inserted into article 100 with tensioning system 300 in an initially loosened condition. In the loosened condition, lacing system 130 and plurality of strap members 136 are unfastened or in an open position to allow entrance of foot 800 within the interior void of upper 120. Lace 340 is connected to strap members 136 of lacing system 130 and is also interconnected to reel member 310 of tensioning assembly 302 by being disposed through aperture 330 in center flange 322 of reel member 310. With this arrangement, winding of lace 340 around portions of reel member 310 will cause tension in lace 340 to pull plurality of strap members 136 of lacing system 130 to a closed position and tighten upper 120 around foot 800 when tensioning system 300 is in the tightened condition.

FIG. 9 illustrates an exemplary embodiment of tensioning system 300 in a tightened condition. In this embodiment, tensioning assembly 302 rotates reel member 310 in the first rotational direction (e.g., counterclockwise) about the central axis to apply tension to lace 340 and tighten tensioning system 300. The interconnection of lace 340 to center flange 322 through aperture 330 causes first lace portion 500 to wind around first shaft section 610 and second lace portion 502 to wind around second shaft section 612 when reel member 310 is rotated in the first rotational direction. The tension applied to lace 340 and transmitted from lace 340 to plurality of strap members 136 moves lacing system 130 to a closed position to secure upper 120 around foot 800 when tensioning system 300 is in the tightened condition.

Similarly, rotation of reel member 310 can be made in the opposite second rotational direction to unwind lace 340 from portions of shaft 312 to return tensioning system 300 to the loosened condition, as shown in FIG. 8 above. In addition, in some embodiments, rotation of reel member 310 in the second rotational direction may be performed by motor 350, by a user manually pulling on lace 340 and/or strap members 136, or both.

In an exemplary embodiment, rotation of reel member 310 in either or both of the first rotational direction and the second rotational direction will cause lace 340 to wind or unwind substantially equally around portions of shaft 312 of reel member 310. That is, the amount of first lace portion 500 wound on first shaft section 610 and the amount of second lace portion 502 wound on second shaft section 612 will be approximately equal on opposite sides of center flange 322 when tensioning system 300 is in the tightened condition. Similarly, during unwinding of lace 340 from reel member 310, approximately equal portions of lace 340 are unwound from opposite sides of center flange 322 when tensioning system 300 is placed in the loosened condition from the tightened condition. That is, the amount of first lace portion 500 unwound or spooled out from first shaft section 610 and the amount of second lace portion 502 unwound or spooled out from second shaft section 612 will be approximately equal.

In some embodiments, a reel member may be provided with provisions to assist with distributing tension through a tensioning system across various portions of an article of footwear. FIG. 6 illustrates an exemplary embodiment of reel member 310 with aperture 330 including a chamfered surface 630 extending around the circumference of the opening on one or both sides or faces of center flange 322. In some embodiments, chamfered surface 630 can extend along a circumference of the opening forming aperture 330 on either or both of first face 622 and second face 623. The chamfering along the circumference of aperture 330 can reduce friction and assist with sliding of lace 340 through aperture 330. With this arrangement, chamfered surface 630 of aperture 330 can assist with adjusting tension of lace 340 in tensioning system 300 across various portions of an upper and/or article of footwear.

As shown in FIG. 7, each opening of aperture 330 on first face 622 and second face 623 has chamfered surface 630 extending around the circumference of the opening of aperture 330. In this embodiment, first lace portion 500 extending through aperture 330 and disposed adjacent to first face 622 may contact chamfered surface 630 and second lace portion 502 extending through aperture 330 and disposed adjacent to second face 623 may also contact chamfered surface 630. With this arrangement, when tension is applied to lace 340 within tensioning system 300, chamfered surface 630 may assist with reducing friction between lace 340 and aperture 330.

In some embodiments, chamfered surface 630 may be a sloped or angled edge extending around the circumference of the opening of aperture 330. The slope or angle of chamfered surface 630 can be sufficient to provide a smooth surface that reduces friction with aperture 330 when lace 340 is under tension within tensioning system 300. In one embodiment, the slope or angle of chamfered surface 630 may be approximately 45 degrees. In other embodiments, however, the slope or angle of chamfered surface 630 may be larger or smaller to reduce friction between lace 340 and aperture 330. In still other embodiments, chamfered surface 630 may have a curved or rounded shape.

Referring now to FIG. 8, an exemplary embodiment of tensioning system 300 in a loosened condition is illustrated. In this embodiment, a foot 800 of a wearer is inserted into article 100 with tensioning system 300 in an initially loosened condition. In the loosened condition, lacing system 130 and plurality of strap members 136 are unfastened or in an open position to allow entrance of foot 800 within the interior void of upper 120. Lace 340 is connected to strap members 136 of lacing system 130 and is also interconnected to reel member 310 of tensioning assembly 302 by being disposed through aperture 330 in center flange 322 of reel member 310. With this arrangement, winding of lace 340 around portions of reel member 310 will cause tension in lace 340 to pull plurality of strap members 136 of lacing system 130 to a closed position and tighten upper 120 around foot 800 when tensioning system 300 is in the tightened condition.

FIG. 9 illustrates an exemplary embodiment of tensioning system 300 in a tightened condition. In this embodiment, tensioning assembly 302 rotates reel member 310 in the first rotational direction (e.g., counterclockwise) about the central axis to apply tension to lace 340 and tighten tensioning system 300. The interconnection of lace 340 to center flange 322 through aperture 330 causes first lace portion 500 to wind around first shaft section 610 and second lace portion 502 to wind around second shaft section 612 when reel member 310 is rotated in the first rotational direction. The tension applied to lace 340 and transmitted from lace 340 to plurality of strap members 136 moves lacing system 130 to a closed position to secure upper 120 around foot 800 when tensioning system 300 is in the tightened condition.

Similarly, rotation of reel member 310 can be made in the opposite second rotational direction to unwind lace 340 from portions of shaft 312 to return tensioning system 300 to the loosened condition, as shown in FIG. 8 above. In addition, in some embodiments, rotation of reel member 310 in the second rotational direction may be performed by motor 350, by a user manually pulling on lace 340 and/or strap members 136, or both.

In an exemplary embodiment, rotation of reel member 310 in either or both of the first rotational direction and the second rotational direction will cause lace 340 to wind or unwind substantially equally around portions of shaft 312 of reel member 310. That is, the amount of first lace portion 500 wound on first shaft section 610 and the amount of second lace portion 502 wound on second shaft section 612 will be approximately equal on opposite sides of center flange 322 when tensioning system 300 is in the tightened condition. Similarly, during unwinding of lace 340 from reel member 310, approximately equal portions of lace 340 are unwound from opposite sides of center flange 322 when tensioning system 300 is placed in the loosened condition from the tightened condition. That is, the amount of first lace portion 500 unwound or spooled out from first shaft section 610 and the amount of second lace portion 502 unwound or spooled out from second shaft section 612 will be approximately equal.

Figure 10:
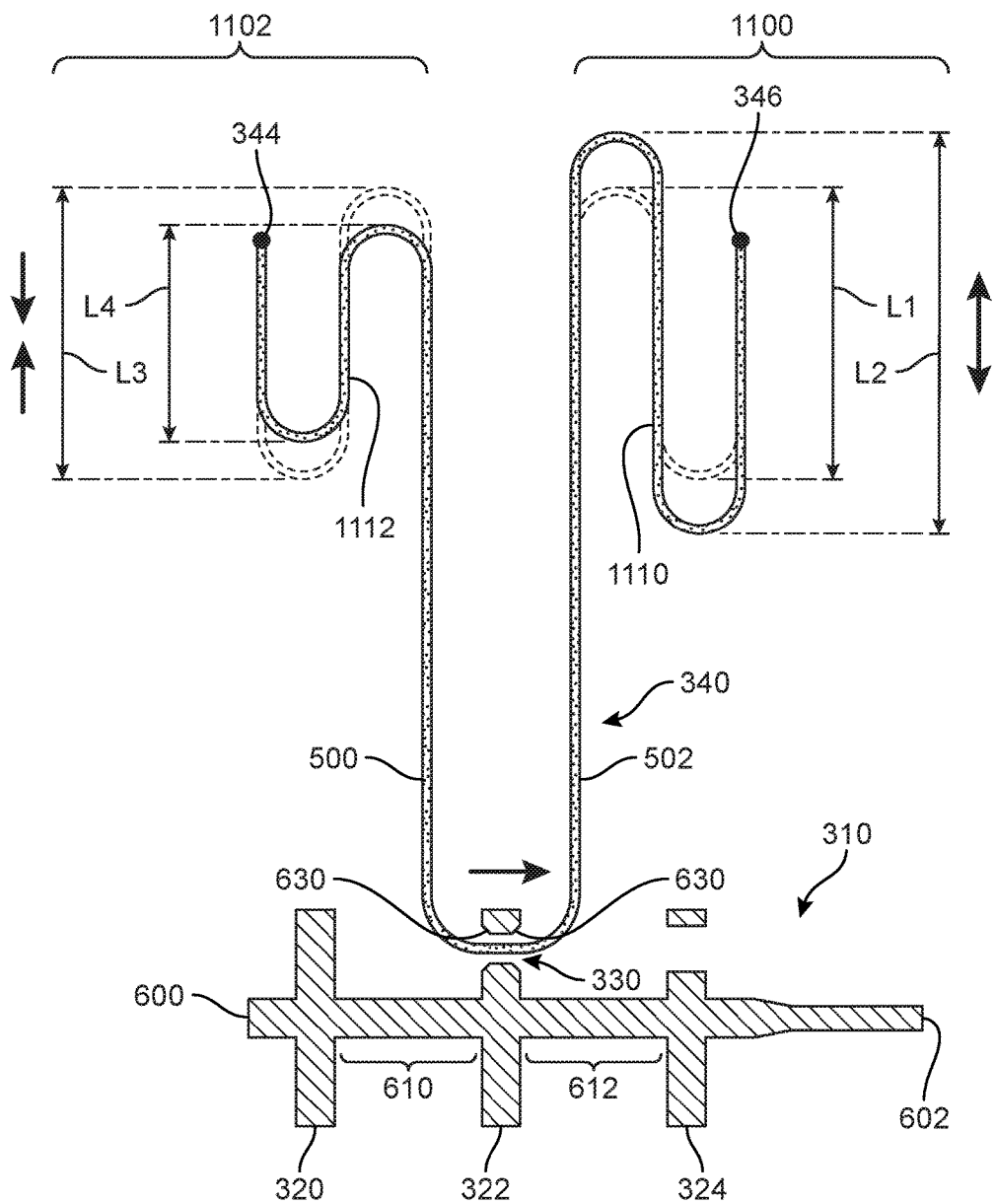
FIG. 10 is a representative view of adjusting tension within a tensioning system.
Figure 11:
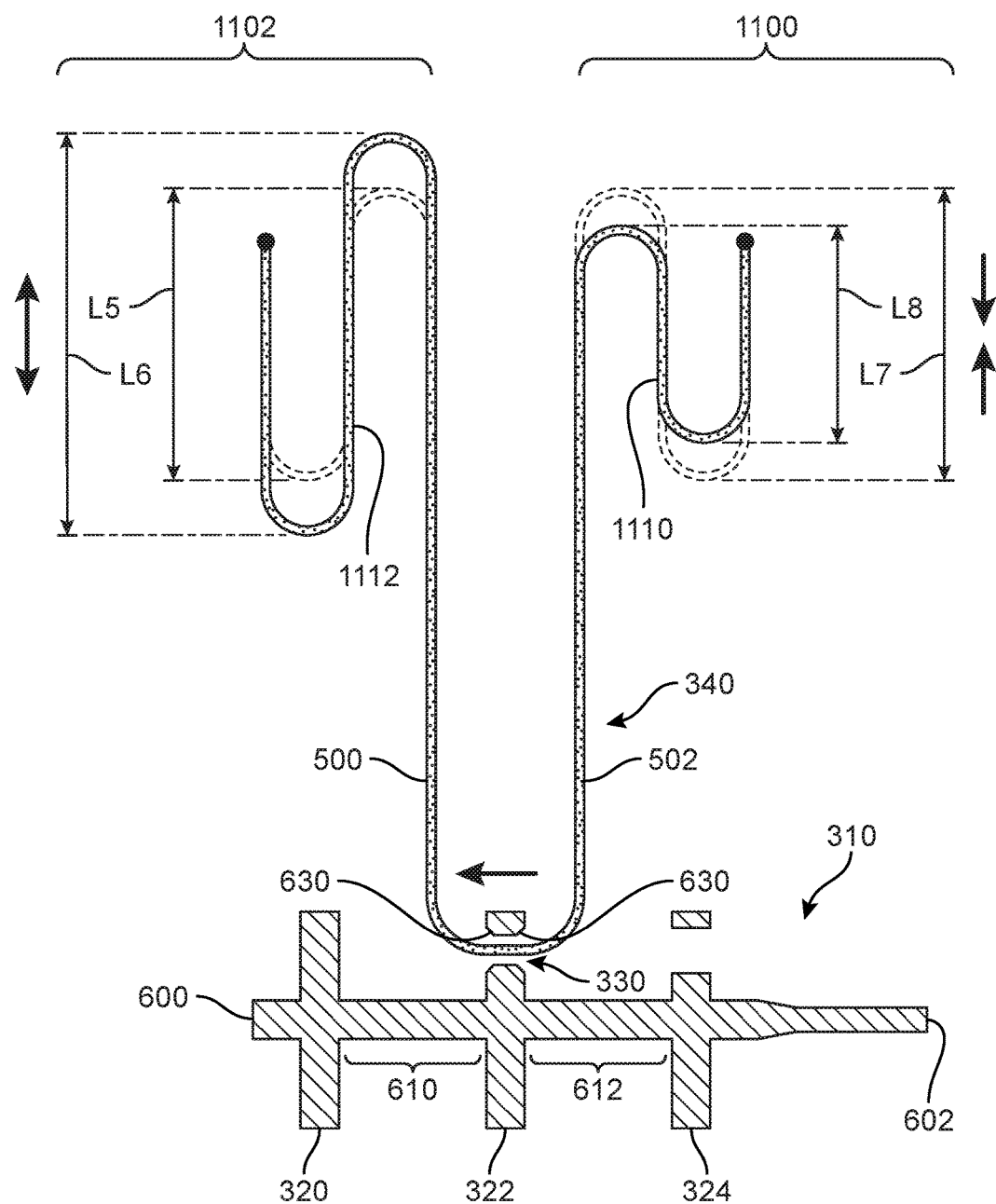
FIG. 11 is another representative view of adjusting tension within a tensioning system.

As shown in FIGS. 10 and 11, chamfered surface 630 of aperture 330 may assist with distributing tension within tensioning system 300 across various portions of upper 120 and/or article 100. FIG. 10 illustrates an example of distributing tension in lace 340 within tensioning system 300 to decrease or lessen the tension in a forefoot region and increase or heighten the tension in a midfoot region of an article of footwear. The tension of lace 340 within tensioning system 300 is adjusted when tensioning system 300 is in a loosed condition so that portions of lace 340 may freely slide through aperture 330 against chamfered surface 630 and change the amount of each of first lace portion 500 and second lace portion 502 that is associated with the forefoot region and midfoot region of the upper and/or article of footwear.

As shown in this embodiment, tensioning system 300 can include lace 340 and can be generally associated with a forefoot region 1100 and a midfoot region 1102 of an upper of an article of footwear. For example, forefoot region 1100 and midfoot region 1102 can correspond to forefoot region 10 and midfoot region 12 of article 100, described above. Lace 340 repeatedly extends across the lacing area and is anchored to a portion the upper in midfoot region 1102 at first anchor 344 and is also anchored to a portion of the upper in forefoot region 1100 at second anchor 346. First anchor 344 and/or second anchor 346 allow lace 340 to be tensioned by tensioning assembly 302 when wound around a reel member, such as reel member 310.

An amount of first portion 500 of lace 340 disposed in midfoot region 1102 slides through aperture 330 in center flange 322 of reel member 310 to increase the amount of second portion 502 of lace 340 disposed in forefoot region 1100. Chamfered surface 630 extending around the circumference of aperture 330 may assist with reducing friction when lace 340 slides through aperture 330. As seen in FIG. 10, a forefoot lace portion 1110 of lace 340 in forefoot region 1100 increases from an initial first length L1 to an increased second length L2. The increase from first length L1 to second length L2 causes tension of lace 340 in tensioning system 300 located in forefoot region 1100 to decrease or lessen once tensioning system is in the tightened condition due to the increased amount of second lace portion 502 that is now disposed within forefoot region 1100. That is, by increasing the amount of lace 340 in forefoot region 1100, tension in tensioning system 300 across forefoot region 1100 of the upper and/or article of footwear is lessened and a more comfortable and/or customized fit may be provided to the foot of a wearer.

Similarly, sliding an amount of lace 340 through aperture 330 will increase the tension of tensioning system 300 in midfoot region 1102. As seen in FIG. 10, a midfoot lace portion 1112 of lace 340 in midfoot region 1102 decreases from an initial third length L3 to a decreased fourth length L4. This decrease from third length L3 to fourth length L4 causes tension of lace 340 in tensioning system 300 located in midfoot region 1102 to increase or heighten due to the decreased amount of first lace portion 500 that is now disposed within midfoot region 1102. That is, by decreasing the amount of lace 340 in midfoot region 1102, tension in tensioning system 300 across midfoot region 1102 of the upper and/or article of footwear is increased and a more comfortable and/or customized fit may be provided to the foot of a wearer.

Referring now to FIG. 11, an example of distributing tension in lace 340 within tensioning system 300 to decrease or lessen the tension in a midfoot region and increase or heighten the tension in a forefoot region of an article of footwear is shown. In contrast to the example shown in FIG. 10, in this case, an amount of second portion 502 of lace 340 disposed in forefoot region 1100 slides through aperture 330 in center flange 322 of reel member 310 to increase the amount of first portion 500 of lace 340 disposed in midfoot region 1102. In addition, chamfered surface 630 disposed extending around the circumference of aperture 330 may also assist with reducing friction when lace 340 slides through aperture 330, in a similar manner as in FIG. 10.

As seen in FIG. 11, midfoot lace portion 1112 of lace 340 in midfoot region 1102 increases from an initial fifth length L5 to an increased sixth length L6. The increase from fifth length L5 to sixth length L6 causes tension of lace 340 in tensioning system 300 located in midfoot region 1102 to decrease or lessen once tensioning system 300 is in the tightened condition due to the increased amount of first lace portion 500 that is now disposed within midfoot region 1102. That is, by increasing the amount of lace 340 in midfoot region 1102, tension in tensioning system 300 across midfoot region 1102 of the upper and/or article of footwear is lessened and a more comfortable and/or customized fit may be provided to the foot of a wearer.

Similarly, sliding an amount of lace 340 through aperture 330 will increase the tension of tensioning system 300 in forefoot region 1100. As seen in FIG. 11, forefoot lace portion 1110 of lace 340 in forefoot region 1100 decreases from an initial seventh length L7 to a decreased eighth length L8. This decrease from seventh length L7 to eighth length L8 causes tension of lace 340 in tensioning system 300 located in forefoot region 1100 to increase or heighten due to the decreased amount of second lace portion 502 that is now disposed within forefoot region 1100. That is, by decreasing the amount of lace 340 in forefoot region 1100, tension in tensioning system 300 across forefoot region 1100 of the upper and/or article of footwear is increased and a more comfortable and/or customized fit may be provided to the foot of a wearer.

The tension in tensioning system 300 can be changed in this manner because of the interconnection between lace 340 and reel member 310 via aperture 330. As described above, approximately equal amounts of lace 340 are wound around the shaft on opposite sides of center flange 322 when tensioning system 300 is in the tensioned condition. In this embodiment, by changing the amount of lace 340 that corresponds to first lace portion 500 in midfoot region 1102 and second lace portion 502 in forefoot region 1100, the relative amount of tension applied in each of these regions will be changed when lace 340 is wound around reel member 310. With this arrangement, tension of tensioning system 300 in midfoot region 1102 and forefoot region 1100 of an article of footwear can be adjusted by changing an amount of first lace portion 500 that is associated with midfoot region 1102 and changing an amount of second lace portion 502 that is associated with forefoot region 1100.

In addition, chamfered surface 630 on both of first face 622 and second face 623 of aperture 330 in reel member 310 reduces friction between aperture 330 and lace 340 to assist with allowing the wearer to slide lace 340 through aperture 330 and to adjust the tension of lace 340 within tensioning system 300.

In various embodiments, different methods of forming an aperture in a center flange of a reel member for a tensioning system may be used. For example, a reel member may be cast or molded with an aperture in one or more flanges. Other known methods may also be used. An exemplary method of forming an aperture in a flange of a reel member is shown with reference to FIGS. 12-19. In this exemplary process, a reel member is provided that can be part of a previously manufactured tensioning assembly and an aperture may be formed in a flange while the reel member is at least partially assembled in the previously manufactured tensioning assembly. In other embodiments, the method of forming the aperture and/or chamfering the aperture may be performed when the reel member is provided separately from the remaining components of the tensioning assembly.

Figure 12:
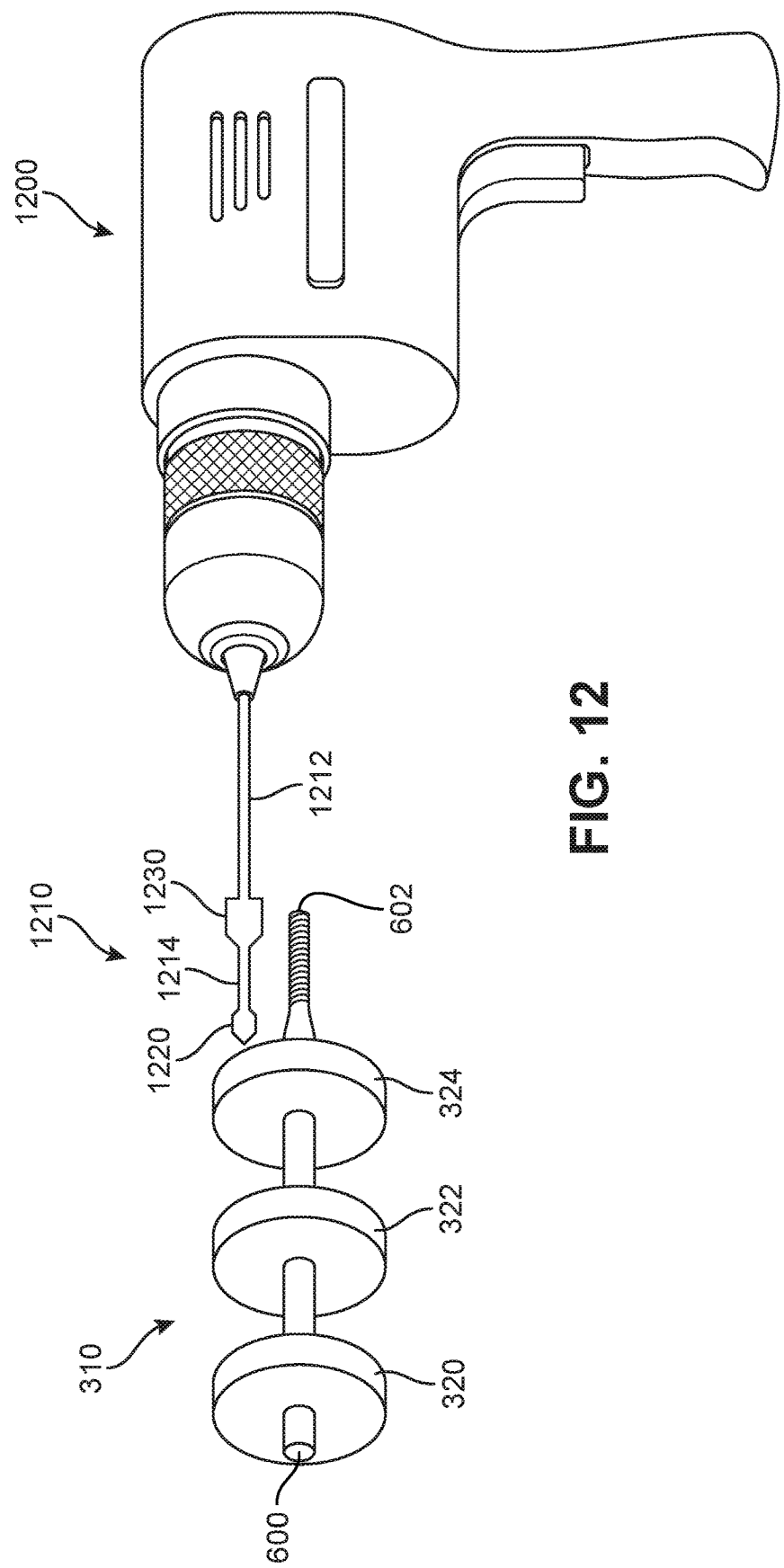
FIG. 12 is a representative view of an exemplary method of forming an aperture in a reel member.

In one embodiment, tensioning assembly 302 can be a previously manufactured tensioning assembly that includes reel member 310 having shaft 312 and at least three flanges extending radially outward from shaft 312. As shown in FIG. 12, the three flanges include first end flange 320, center flange 322, and second end flange 324, described above. Each of first end flange 320, center flange 322, and second end flange 324 are spaced apart from one another along shaft 312.

In some embodiments, the exemplary process of forming an aperture in a flange of the reel member, for example, aperture 330 in center flange 322, may be performed using a drill. For the purposes of illustration, a drill 1200 is shown in FIG. 12 suitable for forming aperture 330. While drill 1200 is shown in the form of a hand-held drill, it should be understood that any suitable drill apparatus, including automated, computer-controlled, and/or manual drill presses or other drilling machines may be used to perform the method described herein.

In an exemplary embodiment, drill 1200 may be provided with a chamfer bit 1210. Drill 1200 is configured to rotate chamfer bit 1210 in a clockwise or counterclockwise direction in a rapid manner to cause chamfer bit 1210 to remove material via drilling. In this embodiment, the method of forming aperture 330 in center flange 322 may also be combined with the method chamfering aperture 330 so as to form chamfered surface 630 extending around the circumference of aperture 330. The method of chamfering aperture 330 to form chamfered surface 630 will be described in more detail below with reference to FIGS. 16-19. While in the exemplary embodiment, the method of forming the aperture and the method of chamfering the circumference of the aperture may be combined during a single process, it should be understood that either method may be performed independently of the other. In the present embodiment, the combined method of forming the aperture and chamfering the aperture using a single process can provide manufacturing efficiencies.

Referring again to FIG. 12, chamfer bit 1210 includes a shank 1212 that connects chamfer bit to drill 1200. In this embodiment, chamfer bit 1210 includes two blades for removing material from the flanges of reel member 310, including a first blade 1220 and a second blade 1230. In an exemplary embodiment, first blade 1220 is a smaller size and has a smaller diameter than second blade 1230. First blade 1220 may be spaced apart from second blade 1230 by an intermediate shank 1214. Intermediate shank 1214 extends between first blade 1220 and second blade 1230 and allows chamfer bit 1210 to move in a direction parallel to the central axis of reel member 310 without causing second blade 1230 to engage with portions of the flanges of reel member 310 after initial contact by first blade 1220. That is, when drilling using chamfer bit 1210, first blade 1220 may initially contact a flange and drill an opening that extends entirely through the flange without having second blade 1230 contact the flange. According, the length of intermediate shank 1214 may be selected to be sufficiently large to permit first blade 1220 to extend fully through a thickness of a flange and keep second blade 1230 from being in contact with the flange.

As shown in FIG. 12, reel member 310 is provided having first end flange 320, center flange 322, and second end flange 324. Drill 1200 using chamfer bit 1210 extends towards reel member 310 from second end 602. In this embodiment, first blade 1220 of chamfer bit 1210 is being brought near contact with outer face 625 of second end flange 324.

Figure 13:
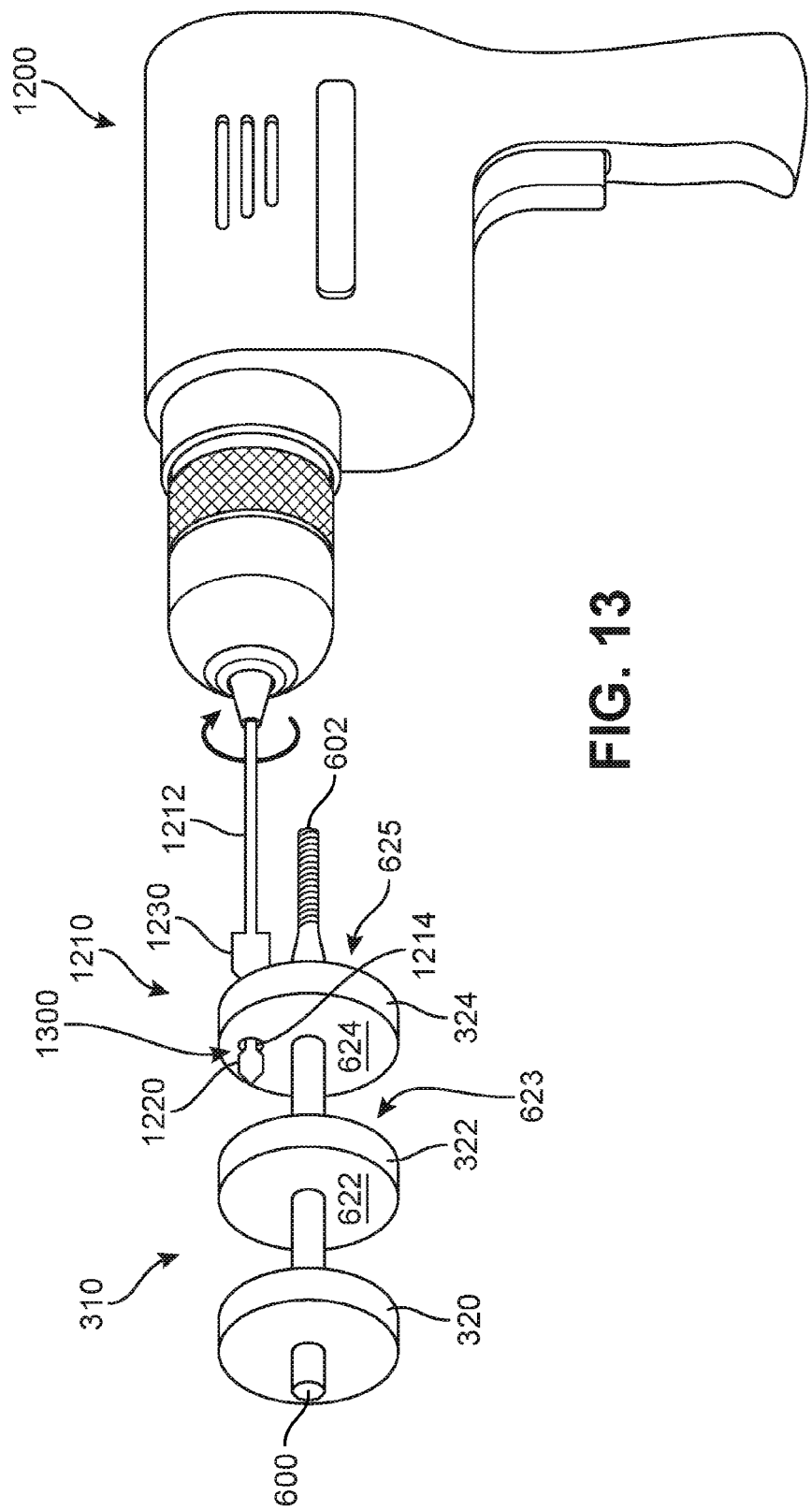
FIG. 13 is a representative view of the exemplary method of forming an aperture in a reel member including drilling through an end flange.

Referring now to FIG. 13, first blade 1220 of chamfer bit 1210 has formed a hole 1300 in second end flange 324 that extends from outer face 625 to inner face 624. In this embodiment, intermediate shank 1214 extends through hole 1300 in second end flange 324 as drill 1200 continues to move in a direction parallel to the central axis of reel member 310 towards first end 600. Hole 1300 has an initial bore diameter that is approximately equal to the diameter of first blade 1220. As drill 1200 continues to drill by rotating chamfer bit 1210 and move towards center flange 322, second blade 1230 of chamfer bit 1210 will contact outer face 625 of second end flange 324.

Figure 14:
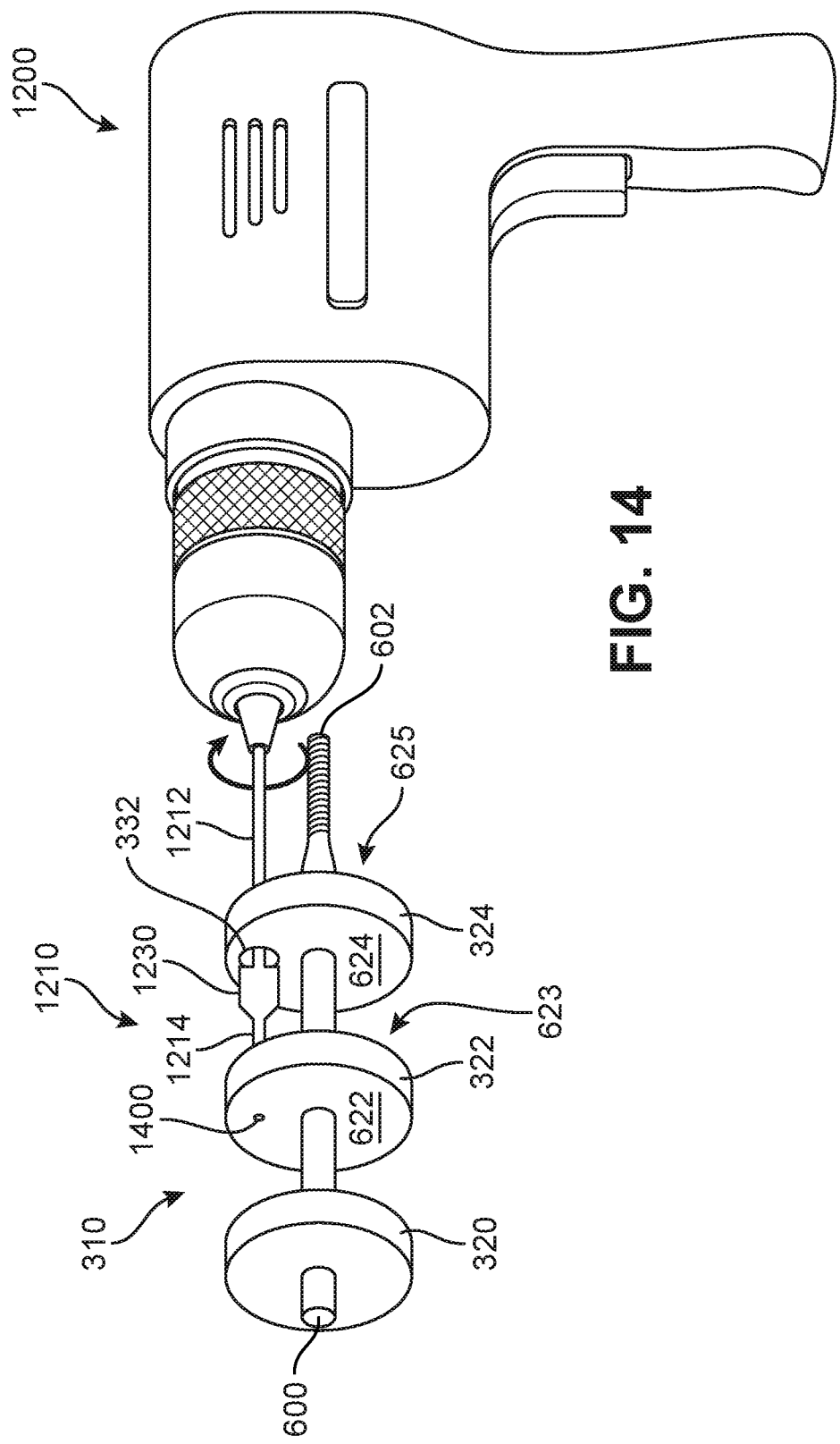
FIG. 14 is a representative view of the exemplary method of forming an aperture in a center flange of the reel member.

Referring now to FIG. 14, drill 1200 has continued drilling through second end flange 324 using chamfer bit 1210. In this embodiment, second blade 1230 has removed material from hole 1300 to form through-hole 332. Through-hole 332 is larger than the initial hole 1300 formed by first blade 1220 due to the larger size or diameter of second blade 1230. Through-hole 332 extends through second end flange 324 between outer face 625 and inner face 624 and allows chamfer bit 1210 to reach center flange 322. As shown in this embodiment, shank 1212 of chamfer bit 1210 extends through through-hole 332 so that chamfer bit 1210 may contact second face 623 of center flange 322. As drill 1200 continues to move in a direction parallel to the central axis of reel member 310 towards first end 600 and rotate chamfer bit 1210, first blade 1220 contacts second face 623 and begins to form a hole 1400.

Figure 15:
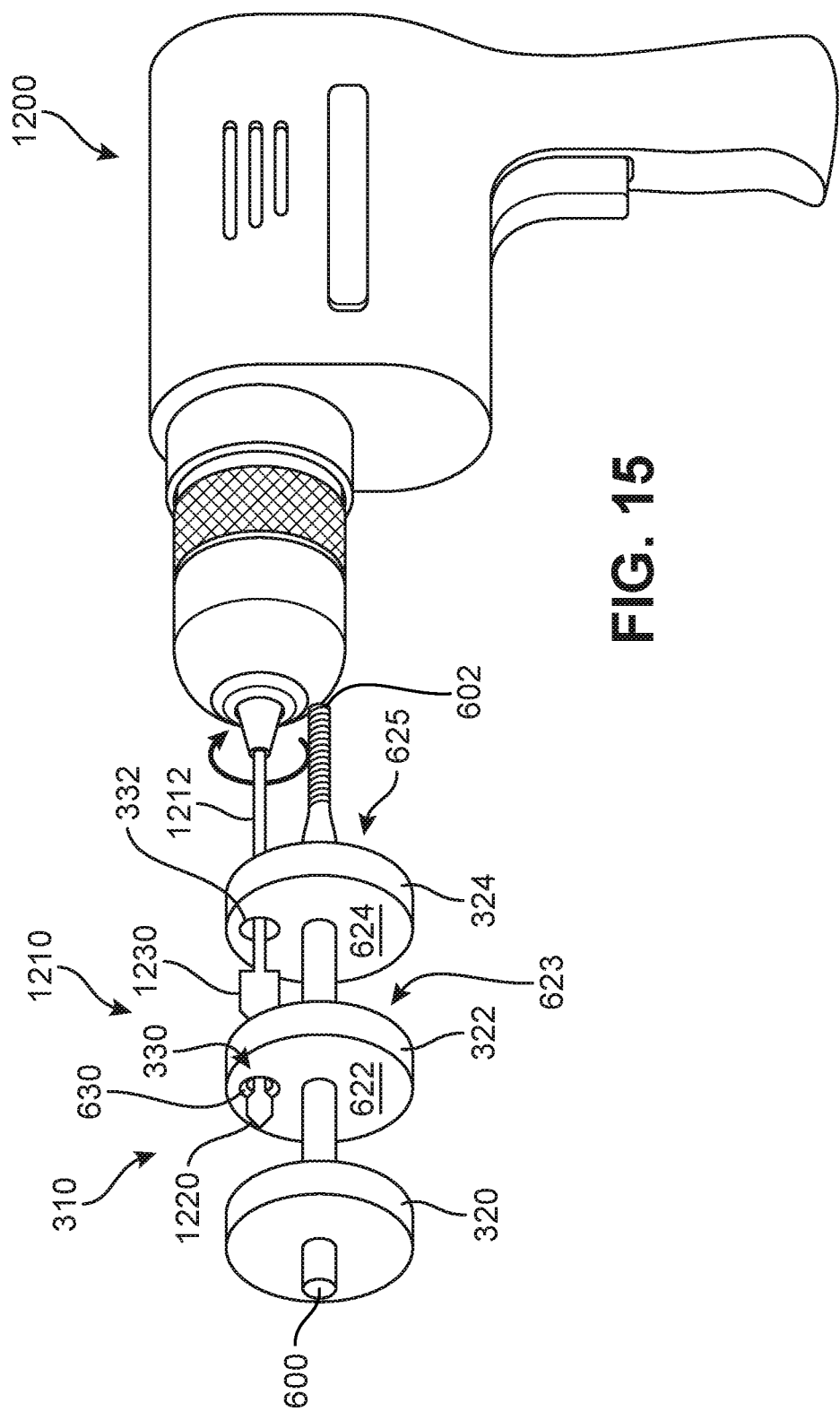
FIG. 15 is a representative view of the exemplary method of forming an aperture in a center flange of the reel member.

Referring now to FIG. 15, drill 1200 has formed aperture 330 in center flange 322. First blade 1220 drilled the initial hole 1400 all the way through center flange from second face 623 to first face 622 to provide the opening forming aperture 330 in center flange 322 of reel member 310. As shown in FIG. 15, first blade 1220 extends fully through aperture 330 and intermediate shank 1214 is disposed within aperture 330. According to this exemplary process, aperture 330 may be formed in center flange 322 of reel member 310 after first forming through-hole 332 in second end flange 324 to permit chamfer bit 1210 of drill 1200 to reach center flange 322. As noted above, in the exemplary described process, drill 1200 approaches center flange 322 from the direction of second end 602 and moves along in a direction substantially parallel to the central axis towards first end 600. In other embodiments, however, the directions described in the method may be reversed and drill 1200 may access center flange 322 from first end 600 of reel member 310, thereby forming through-hole 332 in first end flange 320 instead of second end flange 324.

In addition, as shown in FIG. 15, aperture 330 includes chamfered surface 630 extending around the circumference of the opening of aperture 330 on each of first face 622 and second face 623. An exemplary method of chamfering the edge around the circumference of aperture 330 to form chamfered surface 630 is shown in detail with reference to FIGS. 16 through 19.

Figure 16:
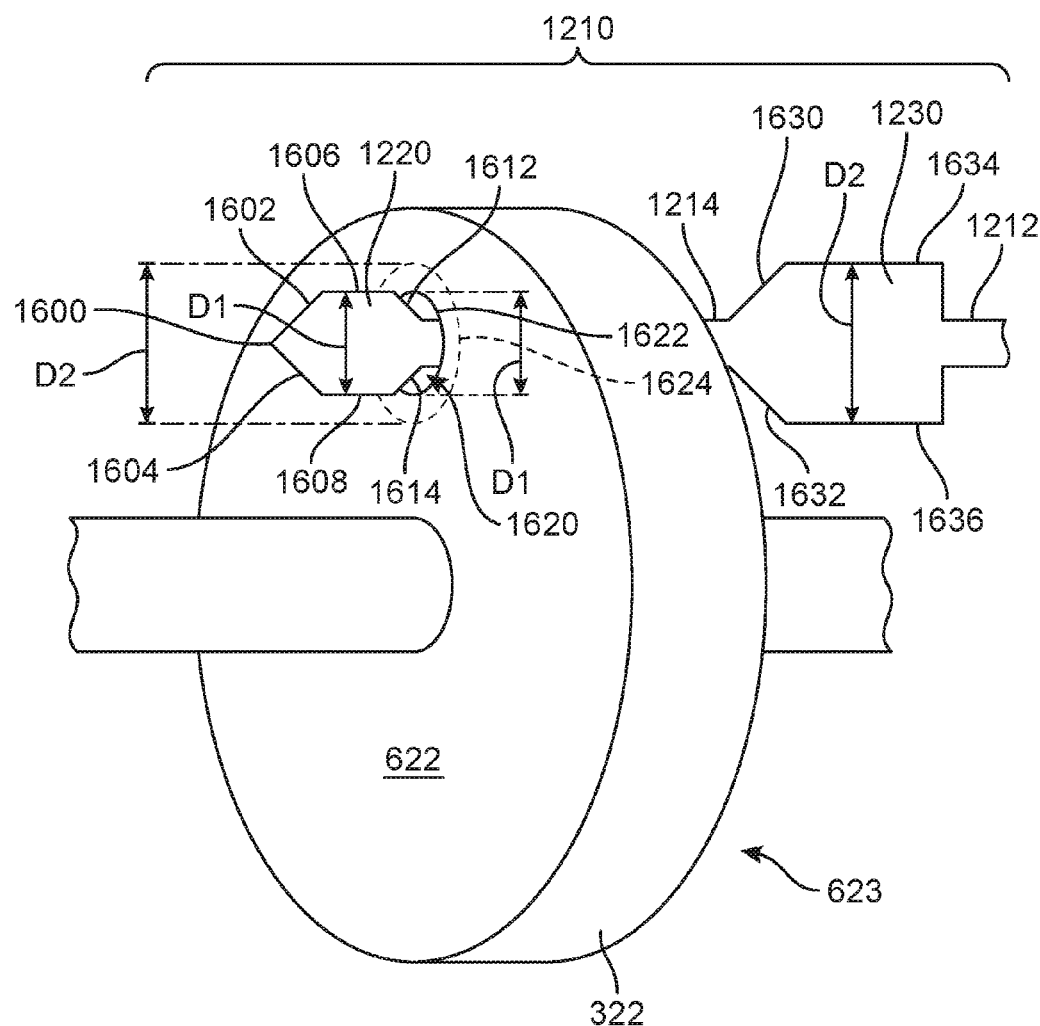
FIG. 16 is an enlarged representative view of an exemplary method of chamfering an aperture in a reel member.

In some embodiments, chamfer bit 1210 may additionally be used to form chamfered surface 630 extending around the circumference of aperture 330 on either or both faces of center aperture 322. Referring now to FIG. 16, an enlarged view of the exemplary process of forming aperture 330 in center flange 322 using chamfer bit 1210 is shown. Chamfer bit 1210 includes first blade 1220 that includes two angled edges that form a point at a tip 1600 of chamfer bit 1210. In this embodiment, first blade 1220 includes a first front chamfering edge 1602 and a second front chamfering edge 1604. First front chamfering edge 1602 and second front chamfering edge 1604 are angled edges of first blade 1210 that meet together at tip 1600 and provide a cutting surface for first blade 1220 to remove material from the flanges of reel member 310.

In some embodiments, first blade 1220 may have an approximately hexagonal shape. As shown in FIG. 16, first blade 1220 extends in a direction parallel to intermediate shank 1214 along a first straight edge 1606 and a second straight edge 1608. First straight edge 1606 continues from first front chamfering edge 1602 and is spaced apart from second straight edge 1608 that continues from second front chamfering edge 1604. Together, first straight edge 1606 and second straight edge 1608 define the size or diameter of first blade 1220. In this case, first straight edge 1606 and second straight edge 1608 are separated by distance equal to a first diameter D1 that defines the diameter of first blade 1220.

In an exemplary embodiment, first blade 1220 may further include angled edges on the backside of first blade 1220, opposite tip 1600, that provide another cutting surface for first blade 1220 to remove material from the flanges of reel member 310. In this embodiment, first blade 1220 includes a first rear chamfering edge 1612 and a second rear chamfering edge 1614. First rear chamfering edge 1612 and second rear chamfering edge 1614 extend along the backside of first blade 1220 to intermediate shank 1214 of chamfer bit 1210. As will be described below, first rear chamfering edge 1612 and second rear chamfering edge 1614 may be used to form chamfered surface 630 along the circumference of aperture 330 on first face 622 of center flange 322.

In some embodiments, second blade 1230 can also include angled edges that provide cutting surfaces for second blade 1230 to remove material from the flanges of reel member 310. In this embodiment, a third front chamfering edge 1630 extends from intermediate shank 1214 towards a third straight edge 1634 and a fourth front chamfering edge 1632 extends in an opposite direction from intermediate shank 1214 towards a fourth straight edge 1636. Third straight edge 1634 and fourth straight edge 1636 define the size or diameter of second blade 1230. In this case, third straight edge 1634 and fourth straight edge 1636 are separated by distance equal to a second diameter D2 that defines the diameter of second blade 1230. In an exemplary embodiment, second diameter D2 of second blade 1230 is larger than first diameter D1 of first blade 1220.

As discussed above, the diameters of first blade 1220 and second blade 1230 form the respective bore diameters of the holes or openings formed in the flanges of reel member 310 drilled using chamfer bit 1210. In this case, aperture 330 in center flange 322 has a bore diameter that is substantially equal to first diameter D1 of first blade 1220 and through-hole 332 in second end flange 324 has a bore diameter that is substantially equal to second diameter D2 of second blade 1230.

Referring again to FIG. 16, in this embodiment, first blade 1220 of chamfer bit 1210 has formed a hole 1620 through center flange 322. Hole 1620 has a bore diameter that is substantially equal to first diameter D1 of first blade 1220. Hole 1620 is defined by an outer perimeter 1622 that extends along the circumference of hole 1620 on first face 622 of center flange 322. As will be described with reference to FIGS. 17-19, chamfer bit 1210 will be used to chamfer along the circumference of outer perimeter 1622 to form chamfered surface 630 by removing material along a chamfer perimeter 1624 extending around hole 1620. In this embodiment, chamfer perimeter 1624 has a diameter that is substantially equal to second diameter D2 of second blade 1230.

Figure 17:
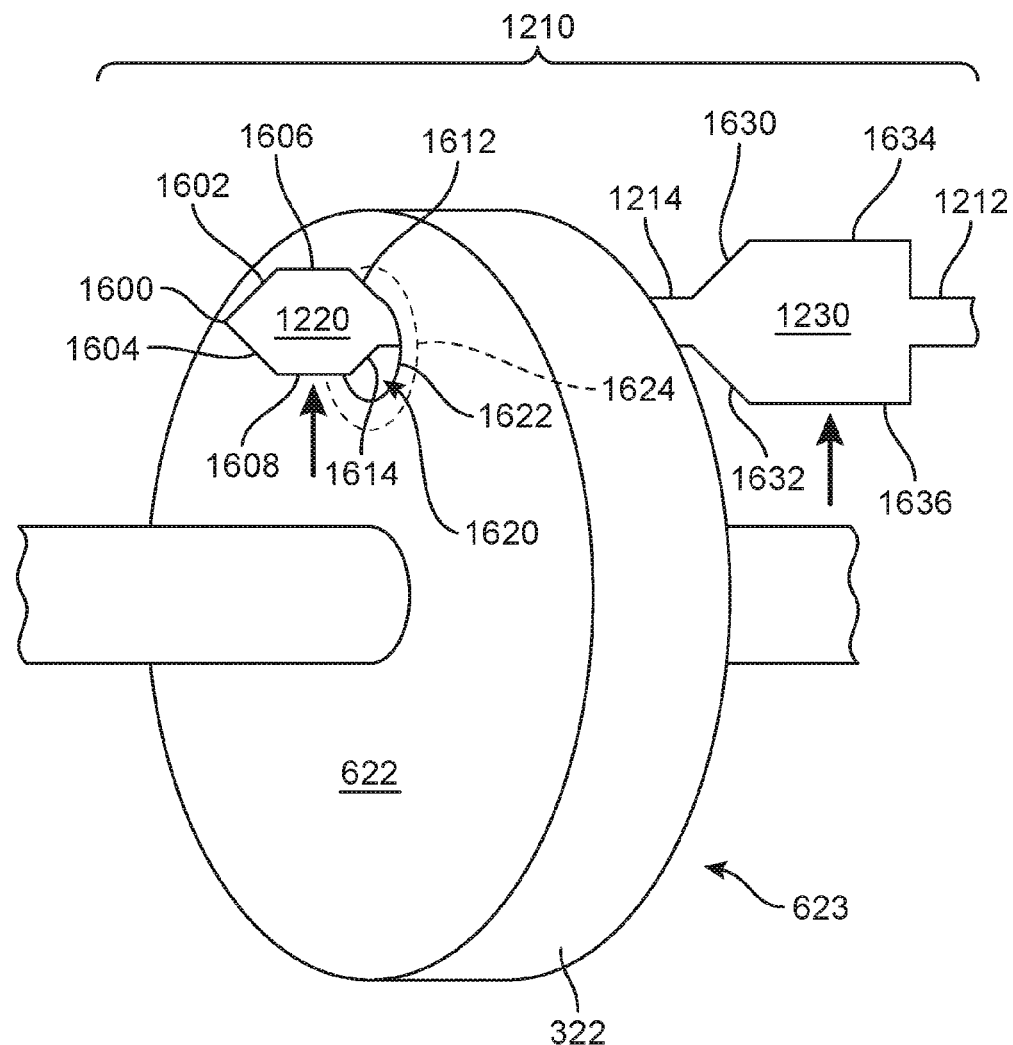
FIG. 17 is an enlarged representative view of an exemplary method of orbiting a drill bit to chamfer an aperture in a reel member.

As shown in FIG. 17, after first blade 1220 of chamfer bit 1210 forms hole 1620 in center flange 322, the exemplary process of chamfering the circumference of hole 1620 to form chamfered surface 630 extending around aperture 330 can begin. To chamfer along outer perimeter 1622 of hole 1620, drill 1200 and/or reel member 310 may be moved up or down, i.e., in a direction approximately perpendicular to the central axis of reel member 310, to place intermediate shank 1214 at the top of hole 1620 and thereby bring first rear chamfering edge 1612 of first blade 1220 in contact with outer perimeter 1622 of hole 1620 on first face 622 of center flange 322. In an exemplary embodiment, when first rear chamfering edge 1612 of first blade 1220 is flush against outer perimeter 1622 of hole 1620, first straight edge 1606 of first blade 1220 will be approximately aligned with chamfer perimeter 1624. From this position, chamfer bit 1210 can be orbited by moving intermediate shank 1214 of chamfer bit 1210 in a clockwise or counterclockwise direction within hole 1620 while chamfer bit 1210 is being rotated by drill 1200.

Figure 18:
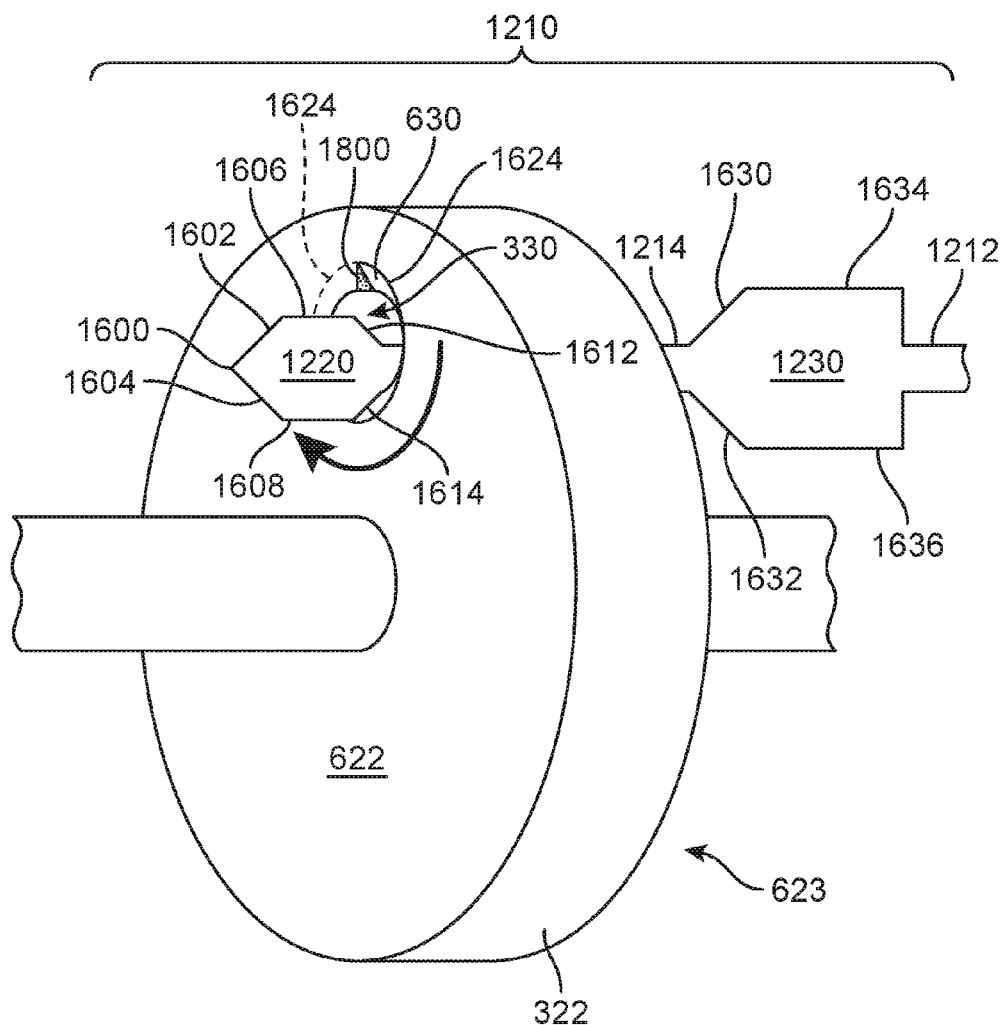
FIG. 18 is another enlarged representative view of an exemplary method of orbiting a drill bit to chamfer an aperture in a reel member.

Referring now to FIG. 18, chamfer bit 1210 has been orbited approximately through one half of a full orbit around hole 1620. In this embodiment, first rear chamfering edge 1612 and second rear chamfering edge 1614 on the backside of first blade 1220 have removed material from around the circumference of hole 1620 to form chamfered surface 630 extending out to chamfer perimeter 1624. As shown in FIG. 18, material 1800 has not yet been removed between chamfer perimeter 1624 and outer perimeter 1622 of hole 1620 to form chamfered surface 630 entirely around the circumference of aperture 330. As drill 1200 rotates chamfer bit 1210 while chamfer bit 1210 continues to orbit within hole 1620, first rear chamfering edge 1612 and second rear chamfering edge 1614 on the backside of first blade 1220 will remove material 1800 and finish forming chamfered surface 630 around the circumference of aperture 330 on first face 622 of center aperture 322

Figure 19:
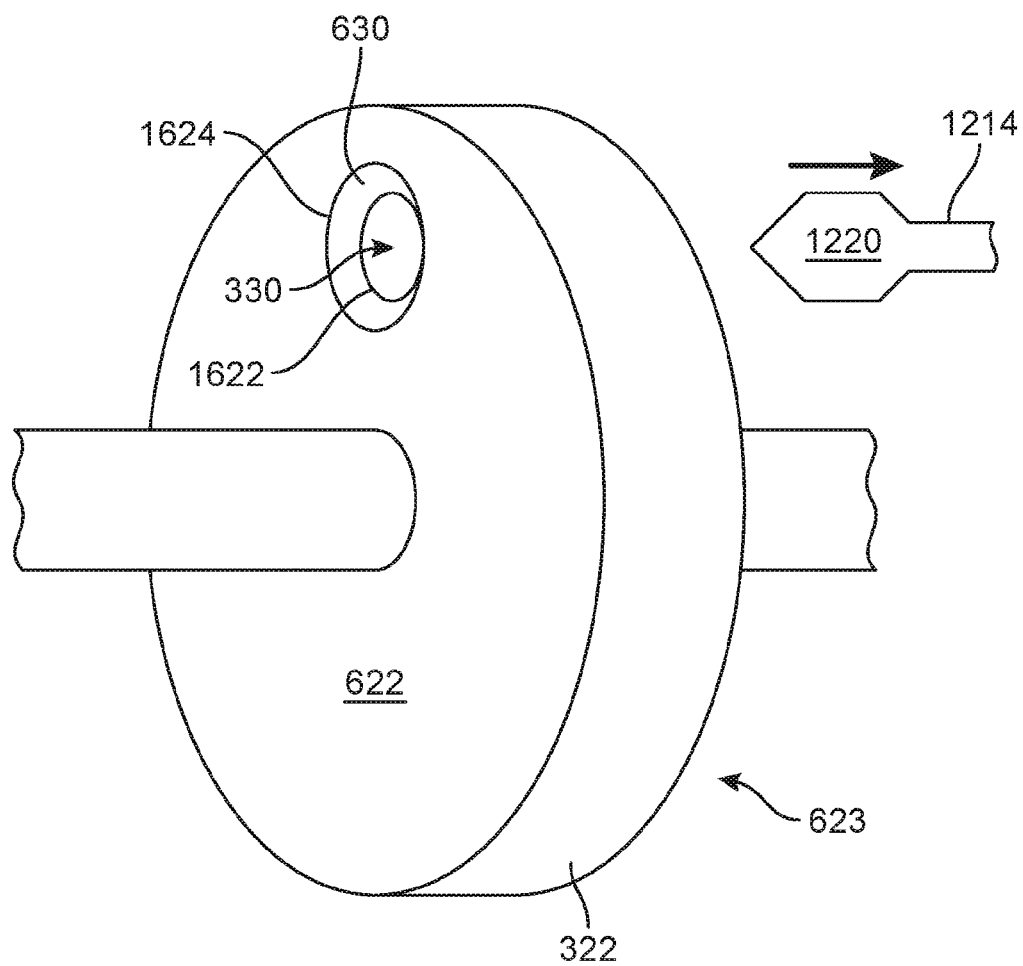
FIG. 19 is an enlarged representative view of an exemplary embodiment of a chamfered aperture in a reel member.

FIG. 19 illustrates the finished aperture 330 with chamfered surface 630 on first face 622 of center aperture 322. In this embodiment, chamfered surface 630 extends outward from outer perimeter 1622 of hole 1620 to chamfer perimeter 1624 around the circumference of aperture 330. In this case, the bore diameter of hole 1620 forming the opening of aperture 330 and defined by outer perimeter 1622 is substantially equal to the diameter of first blade 1220 of chamfer bit 1210, i.e., first diameter D1. Also, in this case, the diameter of chamfer perimeter 1624 defining the extent of chamfered surface 630 around the circumference of aperture 330 is substantially equal to the diameter of second blade 1230 of chamfer bit 1210, i.e., second diameter D2.

In some embodiments, chamfered surface 630 may similarly extend around aperture 330 on second face 623 of center flange 322. In an exemplary embodiment, the chamfering around the circumference of aperture 330 on second face 623 of center flange 322 may be performed during the drilling process of aperture 330. During the exemplary process of forming aperture 330 in center flange 322, the chamfering edges of second blade 1230 may contact second face 623 of center flange 322 to form chamfered surface 630 around aperture 330.

In an exemplary embodiment, third front chamfering edge 1630 and fourth front chamfering edge 1632 of second blade 1230 may remove material surrounding aperture 330 on second face 623 along a diameter that corresponds to second diameter D2 of second blade 1230 to form chamfered surface 630. That is, while the bore diameter of aperture 330 is determined based on the diameter of first blade 1220 (i.e., first diameter D1), the diameter of the chamfered surface 630 extending along the circumference of aperture 330 on second face 623 is determined based on the diameter of second blade 1230 (i.e., second diameter 1230). By orbiting chamfer bit 1210 around hole 1620 along chamfer perimeter 1624, chamfered surface 630 on first face 622 of center flange 322 may have a diameter that is substantially equal to second diameter D2. With this arrangement, chamfered surface 630 on first face 622 of center flange 322 may have a substantially similar diameter as chamfered surface 630 on second face 623 of center flange 322.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of chamfering an aperture in a reel member for use in a tensioning system, the method comprising:
providing a tensioning system including a reel member assembled within the tensioning system, the reel member including a shaft and at least three flanges extending radially outward from the shaft;
forming an aperture in a center flange of the at least three flanges; and
chamfering an edge extending around a circumference of the aperture on at least one of a first face and a second face of the center flange.

2. The method according to claim 1, wherein the step of forming the aperture further comprises forming a through hole in at least one end flange of the at least three flanges prior to forming the aperture in the center flange.

3. The method according to claim 1, wherein forming the aperture comprises drilling the aperture using a chamfer bit.

4. The method according to claim 3, wherein the step of chamfering the edge further comprises using the chamfer bit.

5. The method according to claim 4, further comprising orbiting the chamfer bit around the circumference of the aperture to chamfer the edge.

6. The method according to claim 1, wherein the step of chamfering the edge further comprises chamfering around the circumference of the aperture on both the first face and the second face of the center flange.

7. A method of forming an aperture in a reel member having a shaft and at least three flanges, the method comprising:
providing a reel member including a shaft and at least three flanges extending radially outward from the shaft, the three flanges being spaced apart and including a first end flange, a center flange, and a second end flange;
forming a through-hole in one of the first end flange and the second end flange, the through-hole formed by drilling; and
forming an aperture in the center flange;
wherein forming the aperture includes drilling using a chamfer bit including a first blade having a first diameter and a second blade having a second diameter, the second diameter being larger than the first diameter.

8. The method according to claim 7, wherein the step of forming the through-hole in one of the first end flange and the second end flange is performed prior to forming the aperture in the center flange.

9. The method according to claim 7, further comprising chamfering an edge extending around a circumference of the aperture on at least one of a first face and a second face of the center flange using the chamfer bit.

10. The method according to claim 9, wherein the step of chamfering the edge further comprises chamfering around the circumference of the aperture on both the first face and the second face of the center flange.

11. The method according to claim 7, wherein the through-hole has a bore diameter that is equal to the second diameter; and wherein the aperture has a bore diameter that is equal to the first diameter.

12. The method according to claim 7, further comprising orbiting the chamfer bit around the circumference of the aperture to chamfer the edge on the first face of the center flange with the first blade.

13. The method according to claim 12, further comprising using the second blade of the chamfer bit to chamfer the edge around the circumference of the aperture on the second face of the center flange.

14. A method of forming an aperture in a reel member for use in a tensioning system, the method comprising:

providing a previously manufactured tensioning assembly having a reel member including a shaft and at least three flanges extending radially outward from the shaft, the three flanges including a first end flange, a center flange, and a second end flange;

drilling a through-hole in one of the first end flange and the second end flange; and drilling an aperture in the center flange;

wherein the reel member is assembled within the previously manufactured tensioning assembly during the steps of drilling the through hole and drilling the aperture.

15. The method according to claim 14, wherein at least one of the previously manufactured tensioning assembly and a drill move in a direction parallel to a central axis of the reel member during the steps of drilling the through hole and drilling the aperture.

* * * * *